US005348169A

United States Patent [19]

Allen

[11] Patent Number: 5,348,169

[45] **Date of Patent: * Sep. 20, 1994**

[54] STORAGE RACK SYSTEMS

[75] Inventor: Donald R. Allen, Frenchtown, N.J.

[73] Assignee: Frazier Industrial Company, Long Valley, N.J.

[ * ] Notice: The portion of the term of this patent subsequent to Feb. 9, 2010 has been disclaimed.

[21] Appl. No.: 910,496

[22] Filed: Jul. 8, 1992

[51] Int. Cl.[5] ............ A47F 5/08

[52] U.S. Cl. ............ 211/151; 211/59.2; 414/476; 414/276

[58] Field of Search ............ 211/151, 59.2; 414/476, 414/486, 276, 286

[56] References Cited

U.S. PATENT DOCUMENTS

| | | | |
|---|---|---|---|
| 4,341,313 | 7/1982 | Doring | 211/151 |
| 4,462,500 | 7/1984 | Konstant et al. | 211/151 |
| 4,949,852 | 8/1990 | Allen | 211/151 |
| 5,184,738 | 2/1993 | Allen | 211/151 |
| 5,203,404 | 4/1993 | Allen | 211/151 |

*Primary Examiner*—P. Austin Bradley
*Assistant Examiner*—Chuck Y. Mah
*Attorney, Agent, or Firm*—Joseph W. Molasky & Associates

[57] ABSTRACT

A storage rack system having a plurality of storage bays adapted to store pallet loads that are seven pallets deep is disclosed. One storage rack system disclosed includes six carts each adapted to support a single pallet load and being supported on track means for movement from a forward position to a back position. Another storage rack system disclosed includes a first cart for supporting a single pallet load, and two double carts each adapted to support two pallet loads, the carts being supported on track means for movement from a forward position to a back position.

17 Claims, 16 Drawing Sheets

STORAGE RACK SYSTEMS

BACKGROUND OF THE INVENTION

1. Field of the Invention

This invention relates generally to storage rack systems for articles loaded on pallets of the type adapted to be handled by lift trucks and, more particularly, to storage rack systems of the push-back type.

2. Description of the Prior Art

Push-back storage systems are known in the art with a two deep system being in use since the late 1950's, this system being manufactured by Frazier Industrial Company. More recently, three-deep and four-deep systems are known in the art. In Pat. No. 4,955,489, there is disclosed a storage rack system of the push-back type, and reference is made to the prior art cited in said patent. In Pat. No. 4,949,852, there is disclosed three-deep and four-deep systems having a double cart assembly wherein a large cart rides on the tracks and a small cart is carried by and movably mounted on the large cart. In my pending application, Ser. No. 709,664, filed Jun. 7, 1991, there is disclosed storage rack systems adapted to store pallet loads that are three, four, and five pallets deep.

Typical of the prior art are the storage rack systems shown in U.S. Pat. Nos. 4,341,313 and 4,773,546 wherein there is disclosed a storage rack system to provide for the storage of three pallets deep.

SUMMARY OF THE INVENTION

It is the general object of the invention to provide a storage rack system for storing pallet loads of multiple pallets deep comprising a construction that involves a minimum cost of both manufacture and installation.

Another object of the invention is to provide a storage rack system of the indicated type which incorporates a track means for guiding a plurality of carts along the depth of the system wherein there are provided carts movable from a forward position to back position for storing pallet loads of seven pallets deep.

Briefly stated, the above and other objects of the invention are achieved in accordance with one embodiment of the invention by the provision of a first set of carts associated with a first track means for supporting the first set of carts for movement from forward and back positions, said first set of carts including four carts for supporting loads up to five pallets deep, and including a second set of carts associated with a second track means for supporting the second set of carts for movement from forward and back positions, the second set of carts including a fifth cart and a sixth cart for storing pallet loads at the sixth and seventh deep positions.

The storage rack system of the above-identified type is particularly suited for use in ripening rooms various products such as bananas, tomatoes, and avocados. The benefits of the storage rack system is that it allows a greater density of storage and in combination with the appropriate height can store in a convenient arrangement two full truck loads of fruit products as compared with a lesser amount in a comparable present-day storage arrangement. Further when used in conjunction with ripening rooms, the storage rack of the indicated type can be constructed and arranged to store the product loads flush up against each other to form a compact, air-tight type of loading arrangement by the use of level carts.

Another feature of the storage rack system in accordance with the invention is that it is designed to employ similar carts and use similar components therein involving similar welding procedures whereby all the carts are inherently the same design and construction to thereby reduce the overall cost of the storage rack. Further in this regard, the carts can employ commercially available structural steel components and forms.

The above and other objects of the invention are achieved in accordance with other embodiments of the invention by the provision of a set of carts comprising a first individual cart adapted to store a single pallet load, and two double carts each adapted to support two pallet loads. This storage rack system is adapted to be used with fork-lift trucks of the type known as deed reach trucks, which are constructed and arranged so that the pallet load can be placed either two pallets deep or one pallet deep on the storage rack. A feature of the double carts in accordance with the invention is that each comprises two individual carts connected together, each cart being capable of supporting an individual pallet load independently of the cart connected thereto. This independent connection also permits the carts to be installed individually in the track system and interconnected while positioned in their installed condition on the track means. This arrangement is less cumbersome than a double cart extending the full length of two pallet loads since such a cart is difficult to handle because of its size and construction.

DETAILED DESCRIPTION OF THE PREFERRED EMBODIMENTS

Figure 1:
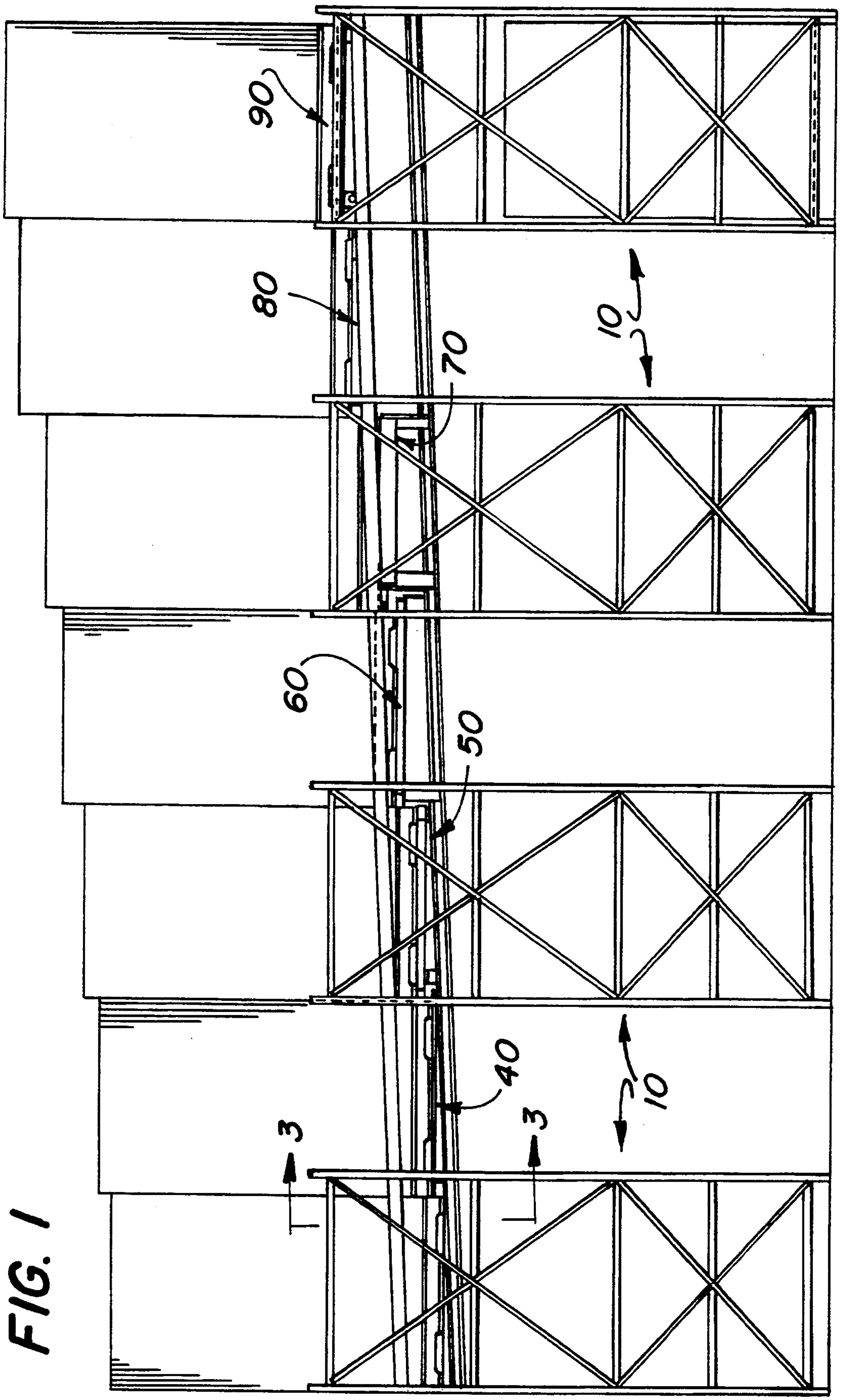
FIG. 1 is a side elevational view illustrating a first embodiment of a storage rack system in accordance with the invention.
Figure 2:
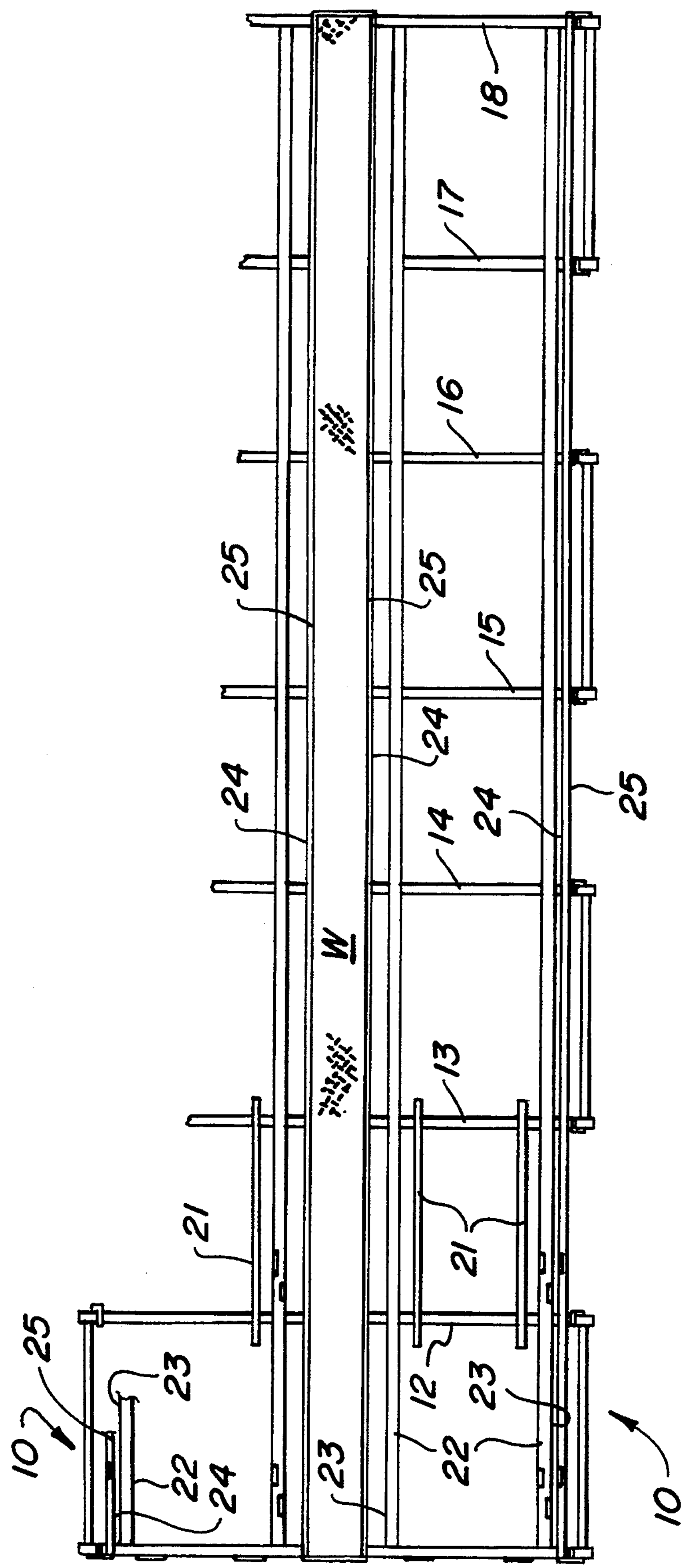
FIG. 2 is a top plan view, partially broken away, showing the track system of the embodiment shown in FIG. 1.

In FIGS. 1–13 there is shown a storage rack system in accordance with the invention specially adapted for use in a banana ripening room and, to this end, is adapted to store pallet loads of seven pallets deep. This system comprises a framework providing a plurality of storage bays each of which is defined by a plurality of uprights and horizontal shelf beams constructed and arranged in a generally conventional arrangement, such as, for example, the storage racks manufactured by Frazier Industrial Company. The framework is shown only partially in the drawings but is shown in more detail in said U.S. Pat. Nos. 4,494,852 and 4,955,489.

Each of the storage bays is constructed of a depth to accommodate two rows of pallets with a walkway therebetween. The walkway provides access to the fans in the rear of the bay used in the ripening process. There are provided a plurality of vertically extending upright frames 10 each of which is comprised of a pair of upright columns joined by horizontally extending ties and, where needed, crossbrace members, this frame structure being conventional in the art and being employed in the storage racks of Frazier Industrial Company. Each of the upright columns on the right side of the storage bay is connected with a corresponding upright column on the left side of a storage bay by means of a plurality of horizontal shelf beams including a front shelf beam 11, six interior shelf beams 12–17 and a rear shelf beam 18. The interior shelf beams 12–17 are connected, by means of bolts and connectors, at their ends with aligned columns of upright frames. This connection design is conventional, the arrangement of the upright frames and horizontal shelf beams being described in detail in said prior patents, and serves to provide support means for the pallets containing the stored loads and to support the track means and carts for positioning the pallet loads in the storage bays. Each storage bay is of a size to contain two rows of pallets each seven deep with a walkway therebetween.

For each row of pallets, there is provided a first track means and a second track means extending along the depth of the storage bay. The first track means is adapted to support a first set of carts for movement along said track means from forward positions to back positions, said first set of carts comprising four carts 40, 50, 60, and 70. The first track means and the associated first set of carts in effect provide a five deep system similar to that shown in my pending application Ser. No. 709,664 to which reference is made for details in construction.

Referring to the drawings, the first track means comprises three pairs of associated tracks, namely, a pair of inner first tracks 21, a pair of middle second tracks 22 and a pair of outer third tracks 23. The pair of second tracks 22 and the pair of third tracks 23 are constructed to extend from the front to the back of the storage bay along the entire depth thereof, while the pair of first tracks 21 are adapted to extend only a short distance, namely, in the region of two pallets deep from the entry end of the storage bay. To this end, the first tracks 21 are supported on the interior shelf beams 12 and 13.

Figure 4:
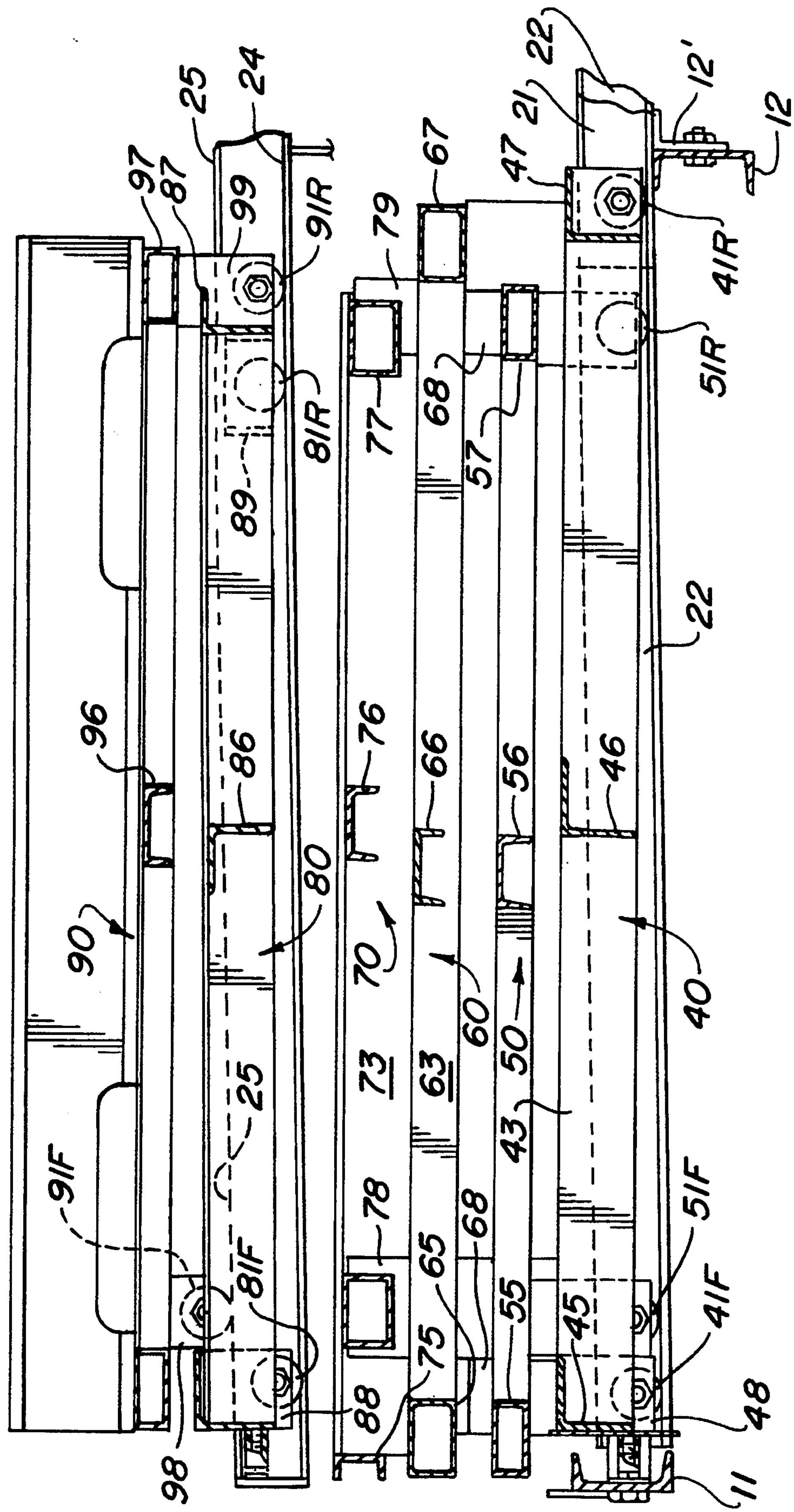
FIG. 4 is a sectional view taken generally on line 4—4 of FIG. 3, with the carts in their forward position.

The first tracks 21 are each provided by a structural member having a C-shaped cross-section, each being arranged to provide inwardly facing flanges. The second and third tracks 22,23 are each provided by a structural member having an I-shaped cross-section, said members being arranged to provide a pair of inwardly facing flanges which provide the second tracks 22 and a pair of outwardly facing flanges which provide the third tracks 23. Each structural member providing tracks 21, 22, and 23 of the track means is supported on and secured to a plurality of the shelf beams 11, 12–17, 18 in a conventional manner as known in the art and described in detail in said prior patents. Briefly, each of said I-shaped structural members providing tracks 22,23 is bolted to a front shelf beam 11 by means of angle brackets and is supported on interior shelf beams 12–17 and secured thereto by angle brackets 12', as shown in FIG. 4, the rear shelf beam 18 being mounted so that the I-shaped structural members are secured thereto by the use of suitable brackets. Also, each of said C-shaped structural members providing tracks 21 is supported on interior shelf beams 12 and 13 and secured thereto by suitable angle brackets.

Figure 5A:
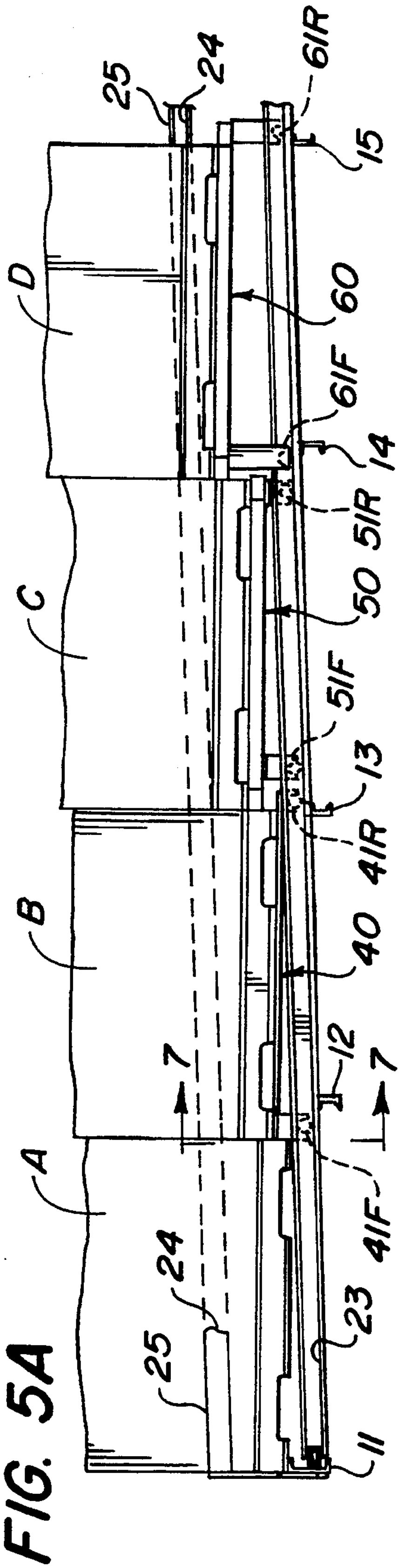
FIGS. 5A and 5B are a side elevational of FIG. 1 showing the cart system arrangement in detail.
Figure 6A:
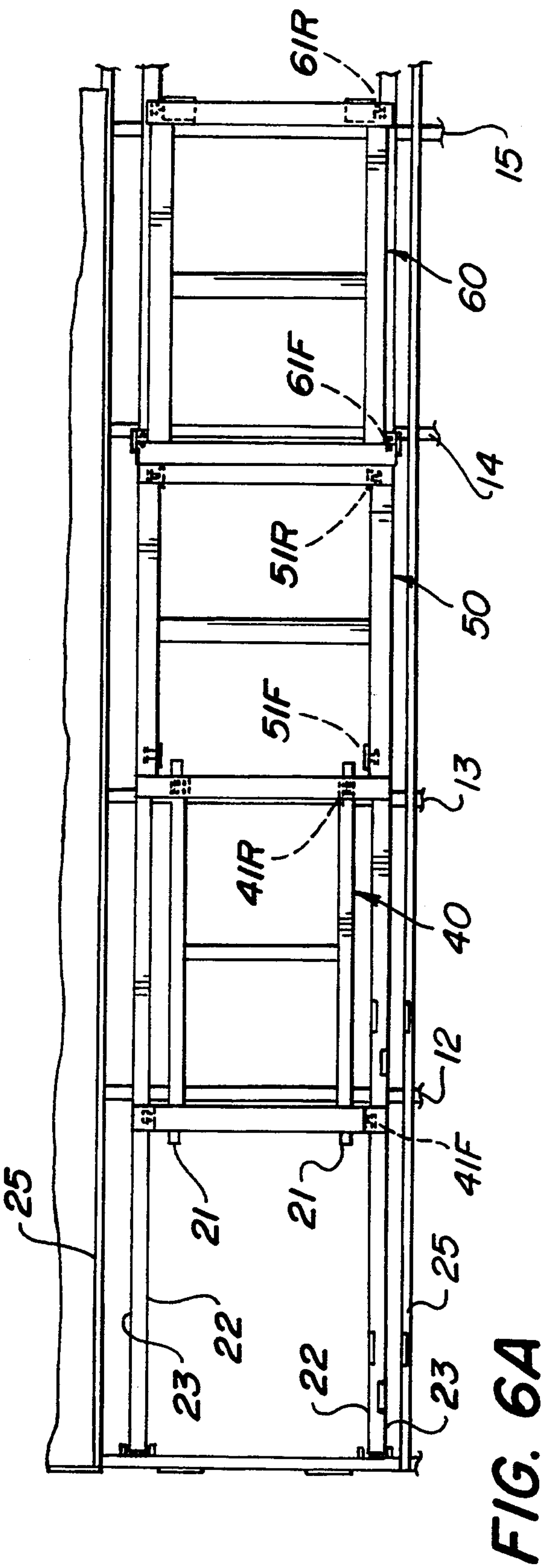
FIGS. 6A and 6B are top plan views of FIGS. 5A and 5B with the pallet loads eliminated to illustrate the top of the cart system.
Figure 5B:
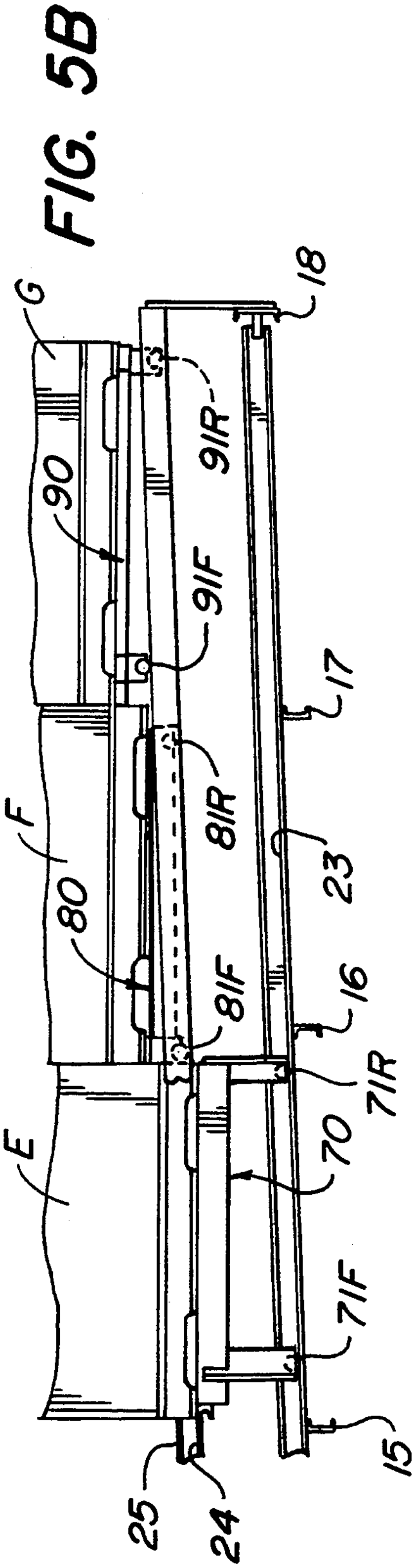
Figure 6B:
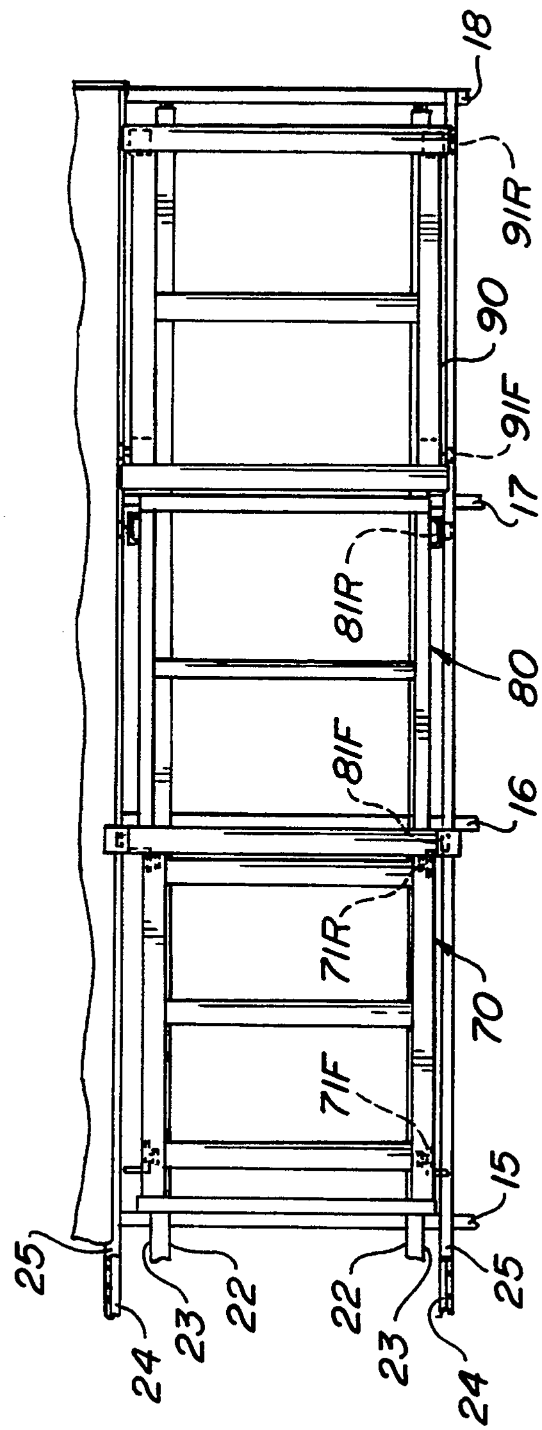

There are provided four carts 40, 50, 60, and 70 which comprise a first set of carts constructed and arranged to ride on the first track means comprising the three pairs of tracks 21, 22, 23 discussed above, for movement along the depth of the storage bay as will be described in detail hereafter. Briefly stated, each of the carts 40, 50, 60 and 70 is mounted for movement along the track means between a forward position, as shown in FIG. 4, and a back position, as shown in FIGS. 5A and 5B.

Figure 3:
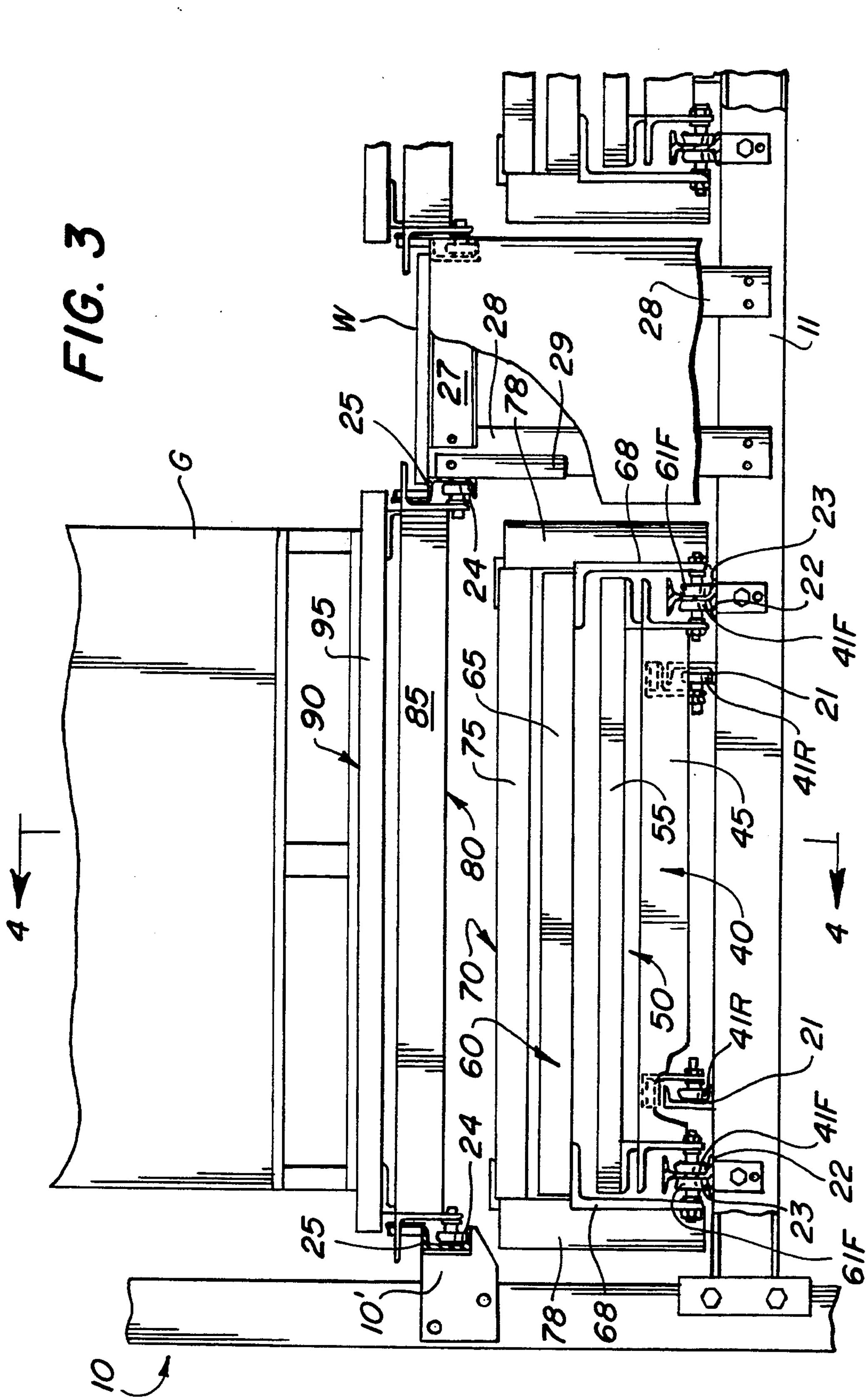
FIG. 3 is a sectional view taken generally on line 3—3 of FIG. 1.

The second track means employed in each row of pallets is adapted to support a second set of carts for movement along said second track means from forward positions to back positions, said second set of carts comprising two carts 80 and 90. The second track means comprises two pairs of associated tracks, namely a pair of lower fourth tracks 24 and a pair of upper fifth tracks 25, said fourth and fifth tracks 24 and 25 being constructed to extend from the front to the back of the storage bay along the entire depth thereof. The fourth tracks 24 are each provided by the inwardly facing lower flange of a structural member having a C-shaped cross-section. The fifth tracks 25 are each provided by the inwardly facing upper flange of said C-shaped structural members. For each pair of associated channel members forming a pair of tracks 24 and 25, one channel member, which may be termed the inner member, is located adjacent the walkway W and the other channel member, which may be termed the outer member, is located adjacent the structural frames 10. Each of the outer members of the second track means providing tracks 24 and 25 is, as best shown in FIG. 3, supported on the upright columns of the frames 10 by brackets 10'. Each of the inner members of the second track means is mounted on the upper end of stanchions 28 by brackets 29, said stanchions 28 being mounted in pairs at their lower ends on the shelf beams 11–18 by an arrangement as best shown in FIG. 3. Channel-shaped cross members 27 are connected to and extend horizontally between the upper ends of pairs of stanchions 28. The arrangement is such that the walkway W is supported by the inner C-shaped channel members forming tracks 24 and 25 and cross members 27, as is best shown in FIG. 3. Thus, the inner channel members of the second track means perform a dual function, namely, to provide a support for the walkway W and also to provide the tracks 24 and 25 for the second track means.

The two carts 80 and 90 are adapted to ride on the track means comprising the two pairs of track 24 and 25 for movement along the depth of the storage bay as will be described in detail hereafter. Briefly stated, each of the carts 80 and 90 is mounted for movement along the track means between a forward position as shown in FIG. 4 and a back position as shown in FIG. 5B.

Figure 8:
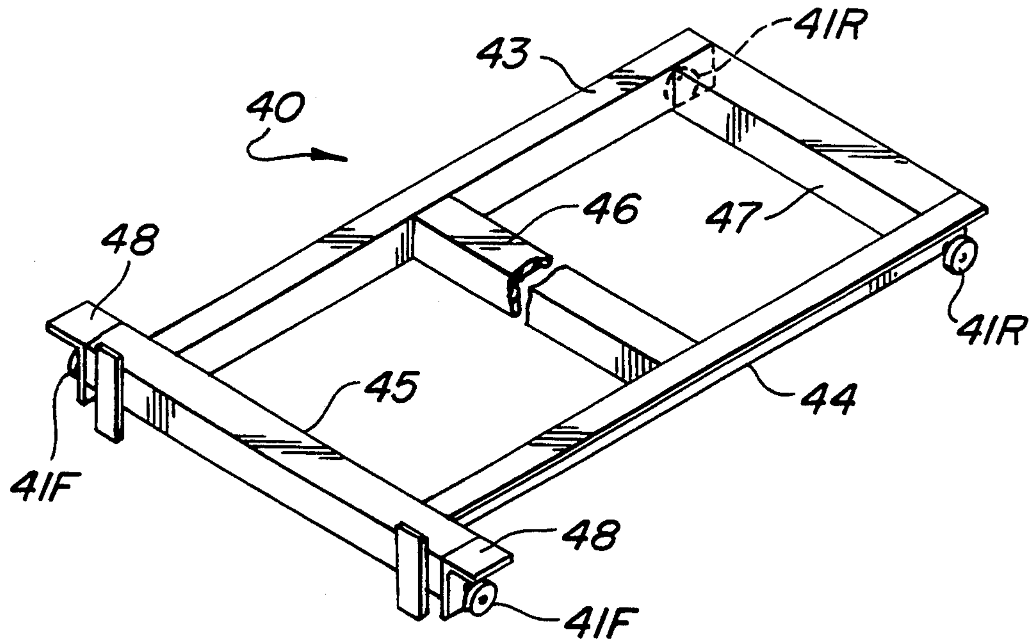
FIGS. 8, 9, 10, 11, 12, and 13 are detailed perspective views of the six carts employed in the storage rack system of FIG. 1.

The first cart 40, which may be termed the lower cart of the first set of carts, includes a rectangular frame formed of a plurality of structural members welded together as best shown in FIG. 8. The frame of cart 40 comprises a pair of side structural angles 43 and 44, a front structural angle 45, a middle structural angle 46 and a rear structural angle 47. Side angles 43 and 44 are welded at their front end to front angle 45 at locations spaced inwardly from the end portions thereof as is best shown in FIG. 8. Middle angle 46 and rear angle 47 extend between and are welded at their ends to side angles 43 and 44. A pair of angle brackets 48 are welded to the ends of front angle 45 in an arrangement shown in FIG. 8 to provide a horizontally extending leg portion extending outwardly from the upper leg portion of their associated end of front angle 45 and a downwardly extending leg portion at each end of front angle 45 for supporting the front wheel assemblies 41F of cart 40. There are provided two bearing-type wheel assemblies mounted on each side of the first cart frame at the front and rear ends thereof to provide four rolling supports for cart 40, the front wheel assembly on each side being indicated at 41F and the rear wheel assembly on each side being indicated at 41R. The construction of the wheel assemblies 41F and 41R and their mounting on the first cart frame will be described more fully hereafter. As best shown in FIG. 3, the front wheel assemblies 41F ride on the inwardly facing tapered bottom flange portions of the I-shaped structural member forming second tracks 22 and the rear wheel assemblies 41R ride on the inwardly facing bottom flange portions of the C-shaped structural members forming first tracks 21. The frame for cart 40 is of a size so as to support a pallet load, as indicated by the pallet load B in the arrangement shown in FIG. 5A.

Figure 9:
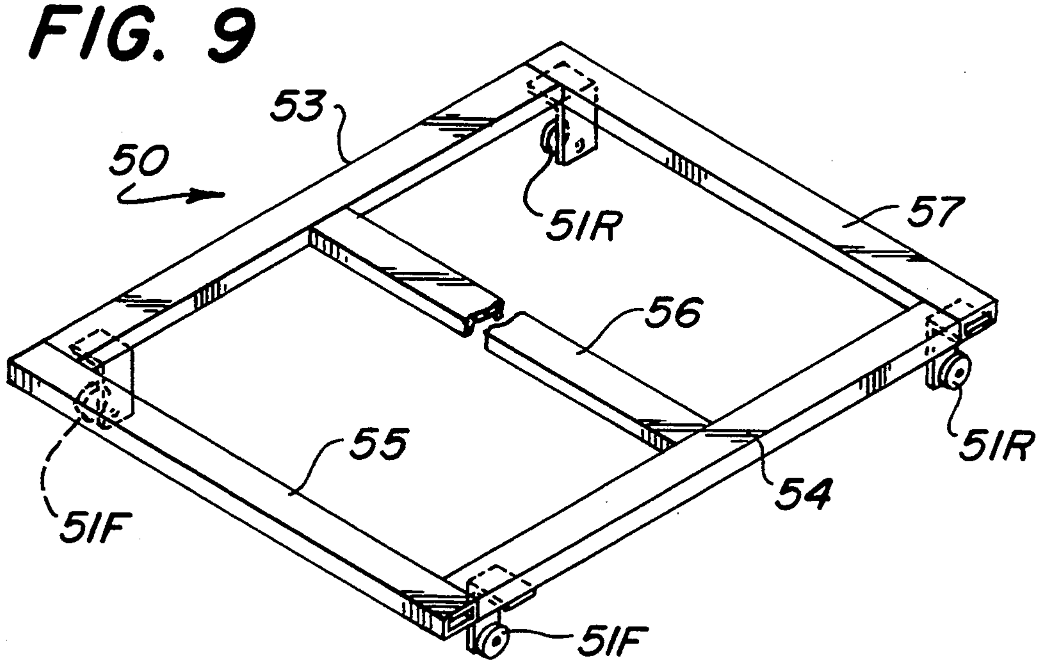

The second cart 50, which may be termed a lower middle cart of the first set of carts is manufactured as an independent unit and includes a rectangular frame for providing support for a loaded pallet, a plurality of wheel assemblies 51F and 51R on each side of the cart frame, and means for supporting each of the wheel assemblies 51F, 51R to make rolling contact with second tracks 22 as cart 50 moves along the depth of the storage bay between a forward and a back position. Second cart 50 includes a rectangular frame formed of five structural members welded together as best shown in FIG. 9. Cart 50 comprises a pair of side tubes 53 and 54, a front tube 55, a middle channel 56 and a rear tube 57. A pair of bearing-type wheel assemblies 51F and 51R are welded at the front and rear ends of side tubes 53 and 54 so as to provide four rolling supports for the second cart 50. As best shown in FIG. 9 the front wheel assemblies 51F are mounted to be spaced rearwardly a short distance from the front end of the cart for a purpose which will be described more fully hereafter. The second cart wheel assemblies 51F and 51R ride on the inwardly facing tapered bottom flange portions of the I-shaped structural members forming the pair of second tracks 22 at locations rearwardly of the front wheel assemblies 41F of first cart 40 as shown in FIG. 4. The frame for cart 50 is of a size so as to be able to support a pallet load as indicated by the pallet load C in the arrangement shown in FIG. 5A.

Figure 10:
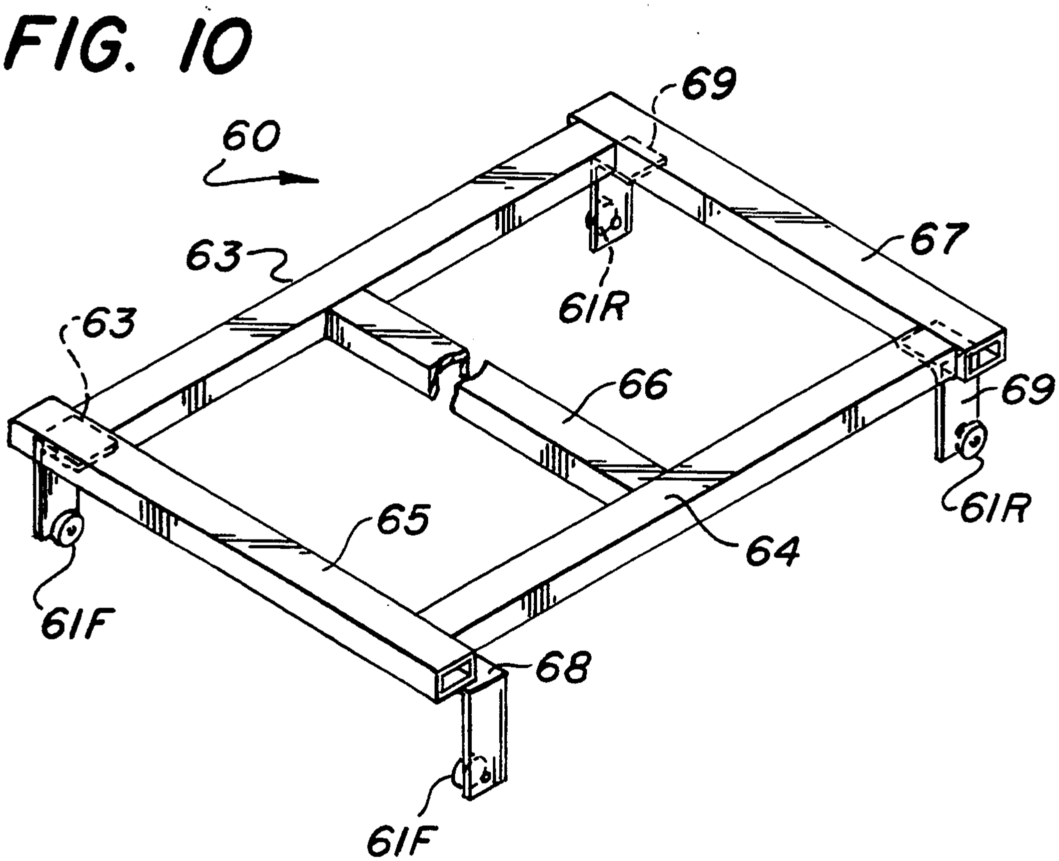

The third cart 60, which may be termed the upper middle cart of the first set of carts, includes a rectangular frame formed of a plurality of structural members welded together as best shown in FIG. 10. The frame of cart 60 comprises a pair of side structural tubes 63 and 64, a front structural tube 65, a middle structural channel 66 and a rear structural tube 67. Side tubes 63 and 64 are welded at their front ends to front tube 65 at locations spaced inwardly from the end portions thereof as is best shown in FIG. 10. Middle tube 66 and rear tube 67 extend between and are welded at their ends to side tubes 63 and 64. A pair of angle brackets 68 are welded to the front end of cart 60 to provide downwardly extending leg portions for supporting inwardly facing front wheel assemblies 61F of cart 60. A pair of angle brackets 69 are welded to the rear end of cart 60 to provide downwardly extending leg portions for supporting outwardly facing rear wheel assemblies 61R of cart 60. The inwardly facing front wheel assemblies 61F ride on the outwardly facing tapered bottom flange portions of the I-shaped structural member forming third tracks 23 and the outwardly facing rear wheel assemblies 61R ride on the inwardly facing bottom flange portions of the structural member forming second tracks 22. The frame for cat 60 is of a size so as to support a pallet load, as indicated by the pallet load D in the arrangement shown in FIG. 5A.

Figure 11:
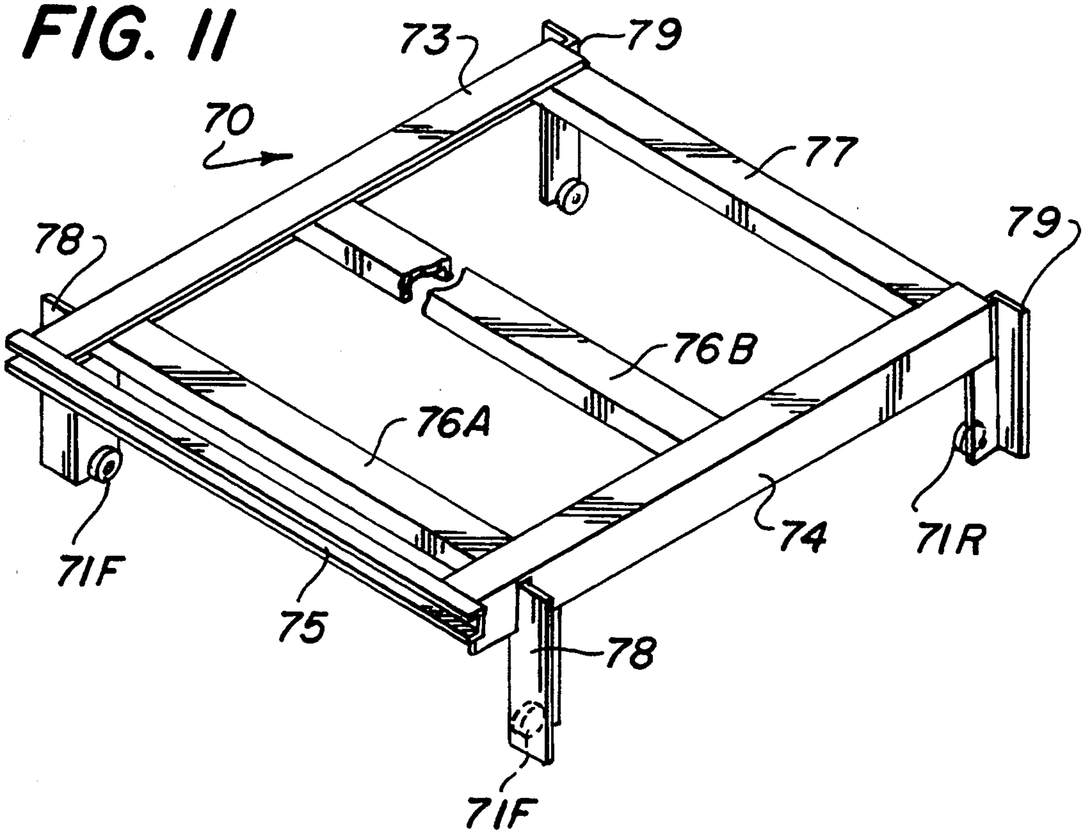

The fourth cart 70, which may be termed the upper cart of the first set of carts, is manufactured as an independent unit and includes a rectangular frame for providing a support for a loaded pallet, a plurality of wheel assemblies 71F and 71R on each side of the cart frame and means for supporting each of the wheel assemblies 71F, 71R to make rolling contact with third tracks 23 as cart 70 moves along the depth of the storage bay between a forward and a back position. Fourth cart 70 includes a rectangular frame formed of six structural members welded together as best shown in FIG. 11. Cart 70 comprises a pair of side angles 73 and 74, a front channel 75, a pair of middle members, i.e. tube 76A and channel 76B, and a rear tube 77. A pair of bearing-type wheel assemblies 71F and 71R are mounted at the front and rear ends of side angles 73 and 74 so as to provide four rolling supports for fourth cart 70. To this end, a pair of angle brackets 78 are welded to the downwardly extending legs of side angles 73 and 74 in an arrangement as best shown in FIG. 11 to provide a downwardly extending leg portion at each end of the tube 76A for supporting inwardly facing front wheel assemblies 71F of cart 70. Also, a pair of angle brackets 79 are welded to tube downwardly extending legs of angles 73 and 74 in an arrangement as best shown in FIG. 11 to provide a downwardly extending leg portion at each end of the rear tube 77 for supporting inwardly facing rear wheel assemblies 71R. By this construction the front wheel assemblies 71F are mounted to be spaced rearwardly a short distance from the front end of cart 70 for a purpose which will be described more fully hereafter. The fourth cart wheel assemblies 71F and 71R are arranged to ride on the outwardly facing tapered bottom flange portion of the I-shaped structural members forming the pair of third tracks 23 at locations rearwardly of the front wheel assemblies 61F of third cart 60. The frame for cart 70 is of a size so as to be able to support a pallet load as indicated by the pallet load E in the arrangement shown in FIG. 5B.

Figure 12:
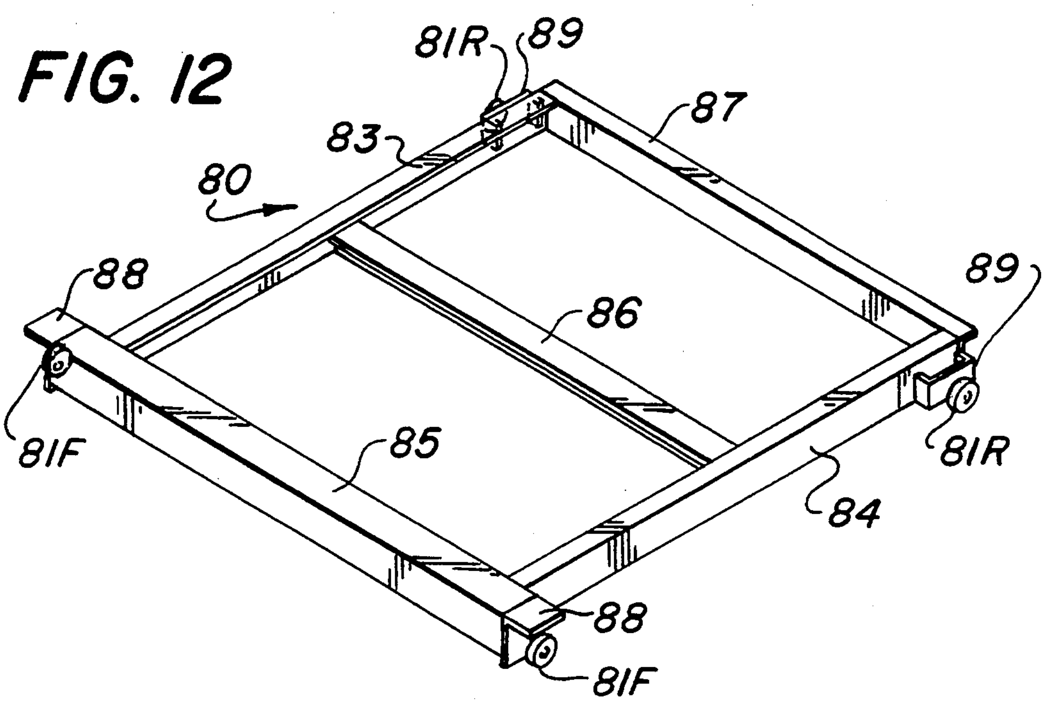

The fifth cart 80, which may be termed the lower cart of the second set of carts, includes a rectangular frame formed of a plurality of structural members welded together as best shown in FIG. 12. The frame of cart 80 comprises a pair of side structural angles 83 and 84, a front structural angle 85, a middle structural angle 86 and a rear structural angle 87. Side angles 83 and 84 are welded at their front ends to front angle 85 at locations spaced inwardly from the end portions thereof as is best shown in FIG. 12. Middle angle 86 and rear angle 87 extend between and are welded at their ends to side angles 83 and 84. A pair of angle brackets 88 are welded to the ends of front angle 85 in an arrangement shown in FIG. 12 to provide a horizontally extending leg portion extending outwardly from the upper leg portion of their associated end of front angle 85 and a downwardly extending leg portion at each end of front angle 85 for supporting the front wheel assemblies 81F of cart 80. There are provided two bearing-type wheel assemblies mounted on each side of the fifth cart frame at the front and rear ends thereof to provide four rolling supports for cart 80, the front wheel assembly on each side being indicated at 81F and the rear wheel assembly on each side being indicated at 81R. The construction of the wheel assemblies 81F and 81R and their mounting on the first cart frame will be described more fully hereafter. As best shown in FIG. 4, the front and rear wheel assemblies 81F and 81R ride on the inwardly facing tapered bottom flange portions of the C-shaped structural member forming fourth tracks 24. The frame for cart 80 is of a size so as to support a pallet load, as indicated by the pallet load F in the arrangement shown in FIG. 5B.

Figure 13:
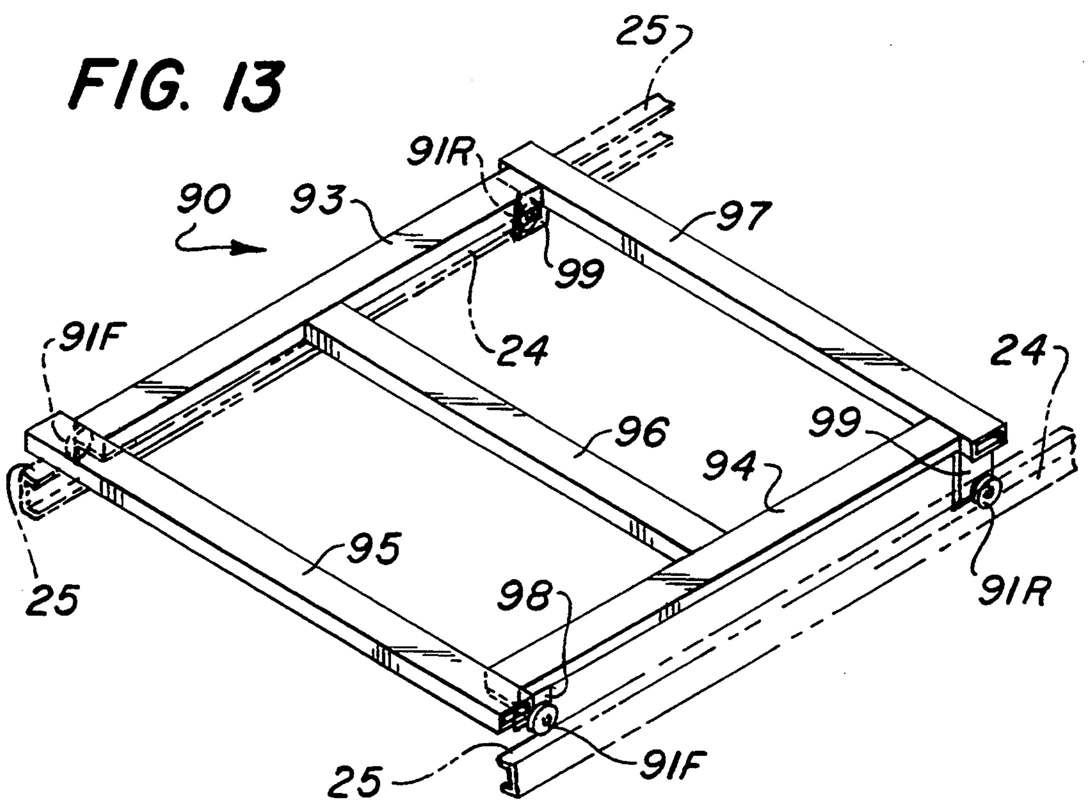
Figure 14:
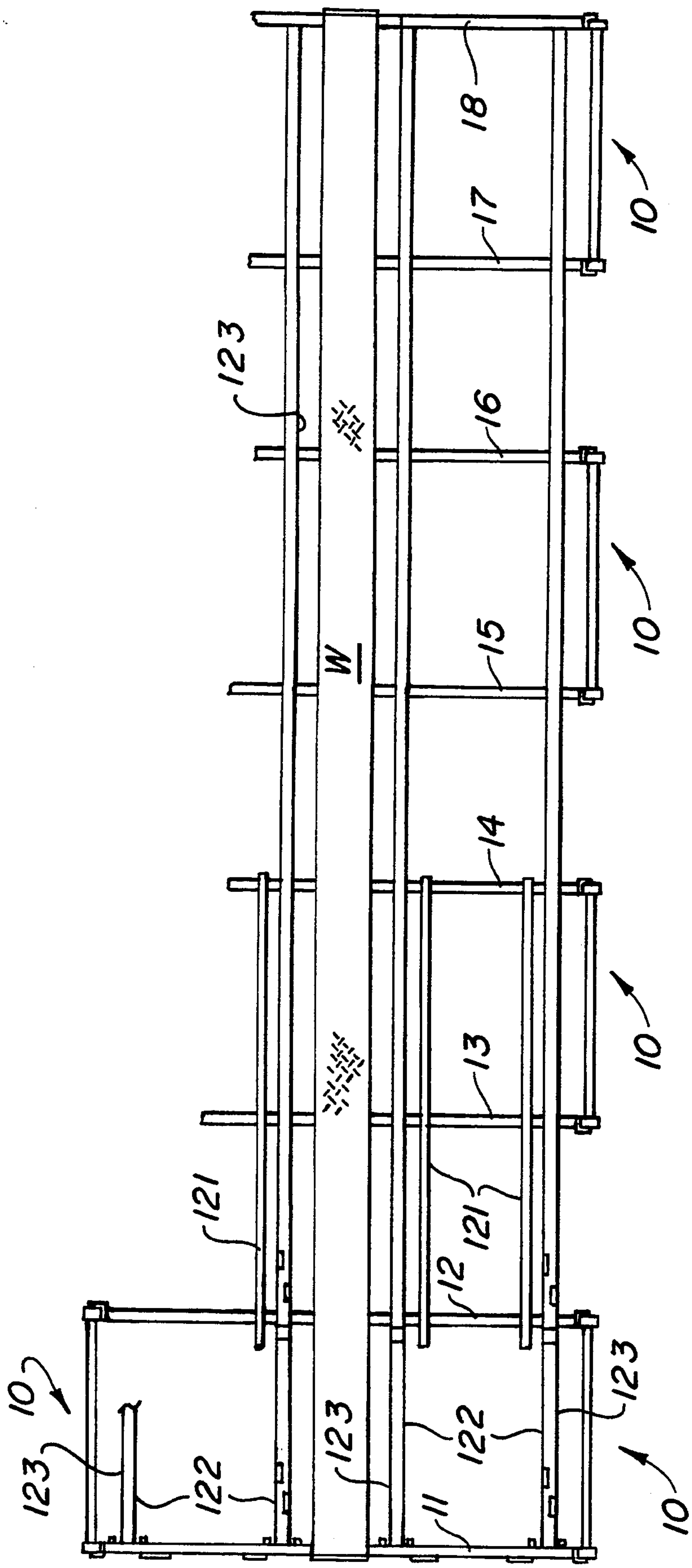
FIG. 14 is top plan view, partially broken away, illustrating the track system for a second embodiment of the invention.

The sixth cart 90, which may be termed the upper cart of the second set of carts, is manufactured as an independent unit and includes a rectangular frame for providing support for a loaded pallet, a plurality of wheel assemblies 91F and 91R on each side of the cart frame, and means for supporting each of the wheel assemblies 91F, 91R to make rolling contact with second track means as cart 90 moves along the depth of the storage bay between a forward and a back position. Second cart 90 includes a rectangular frame formed of five structural members welded together as best shown in FIG. 13. Cart 90 comprises a pair of side tubes 93 and 94, a front tube 95, a middle tube 96 and a rear tube 97. A pair of bearing-type wheel assemblies 91F and 91R are mounted on supports 98 and 99, respectively, welded at the front and rear ends of side tubes 93 and 94 so as to provide four rolling supports for the second cart 90. As best shown in FIG. 9 the front wheel assemblies 91F are mounted to be spaced rearwardly a short distance from the front end of the cart 90. The rear wheel assemblies 91R ride on the inwardly facing lower flange portions of the C-shaped structural members forming the pair of fourth tracks 24 at locations rearwardly of the rear wheel assemblies 81R of fifth cart 80, as shown in FIG. 4. The front wheel assemblies 91F ride on the top surfaces of the inwardly facing upper flange portions of the C-shaped structural members forming the pair of fifth tracks 25. The frame for cart 90 is of a size so as to be able to support a pallet load as indicated by the pallet load G in the arrangement shown in FIG. 5B.

Figure 7:
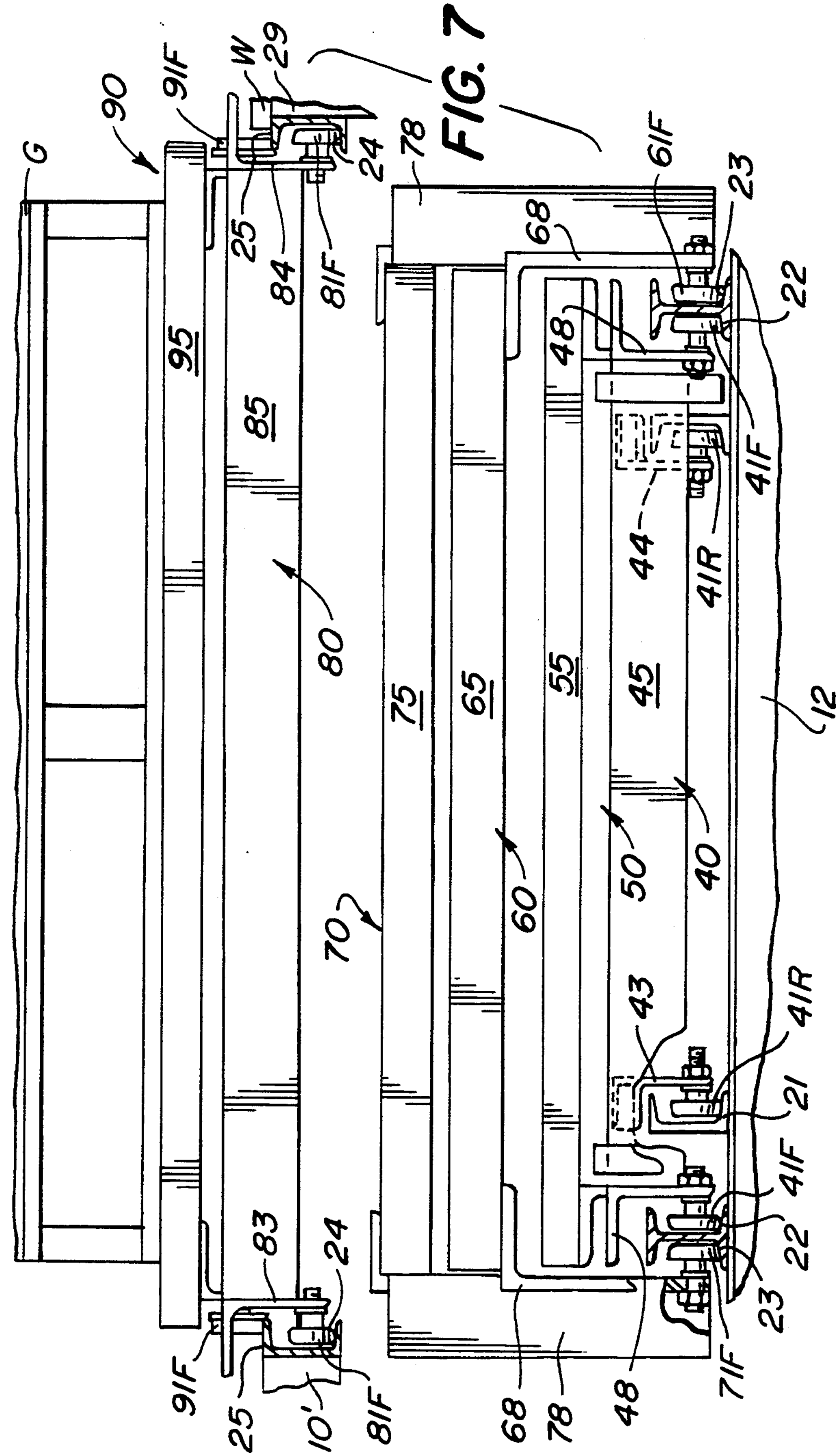
FIG. 7 is a sectional view taken generally on line 7—7 of FIG. 5A and illustrating a front view of the cart system.

The wheel assemblies for the carts 40, 50, 60, 70, 80 and 90 are of the same general construction and are mounted on vertically extending leg portions of said carts by conventional means and in a manner as described in detail in said prior mentioned patents. Briefly, the mounting means comprises horizontally extending holes punched in vertically extending legs of the wheel supporting brackets with each hole being used to mount wheel assembly. Each of the wheel assemblies has a horizontally extending axle having a threaded reduced diameter portion extending on a horizontal axis through the hole in the vertically extending supporting bracket. Typically, the reduced diameter portion of the axle extends through a pair of washers on the opposite sides of said vertically extending legs and is threadedly engaged with a nut in an arrangement whereby the axle is secured in place to extend on a horizontal axis. A wheel rim is rotatable supported on a hub of the axle by means of roller bearing means positioned between the hub and the wheel rim by conventional sealed roller bearing construction. The wheel rim for the wheel assemblies of carts 40, 50, 60, 70, 80 and the rear wheel assemblies of cart 90 is formed with a tapered outer or rolling surface, the taper angle being the same as the taper angle formed on the associated bottom flange portion of the structural members forming tracks 21, 22, 23 and 24. The wheel rims for the front wheel assemblies 91F of cart 90 have a conventional flanged construction, as is best shown in FIG. 7, for guiding the cart 90 on the top of the upper flanges of the C-shaped structural members providing tracks 25.

The carts 40-90 are each mounted into the tracks on which they ride by the use of cut-outs formed in the upper flanges of the structural members forming said tracks, said installation procedure being conventional in the art and being described in detail in my prior application Ser. No. 709,664. Briefly, the cut-outs are located to correspond to the spacing of the wheel assemblies of the associated carts and actual field insertion is achieved by a procedure whereby the cart are tilted at an angle and the leftside wheels are slipped into the lefthand tracks and the cart is maneuvered so that the rightside cart wheels can then be dropped through the track cut-outs into the installed position on the tracks.

In accordance with the invention, cart 40 is arranged so that its front wheel assemblies 41F ride on the tracks 22 while its rear assemblies 41R ride on the tracks 21 as cart 40 moves between a forward position at the entry end of the storage bay and a back position two pallets deep from the entry end of the storage bay. Cart 50 is arranged so that both its front and rear wheel assemblies 51F and 51R are positioned to ride on the tracks 22 as cart 50 moves between a forward position at the entry end of the storage bay and a back position three pallets deep from the entry end of the storage bay. Cart 60 is arranged so that its front wheel assemblies 61F ride on third tracks 23 and its rear wheel assemblies 61R ride on second tracks 22 as cart 60 moves from a forward position at the entry end of the storage bay and a back position four pallets deep from the entry end of the storage bay. Cart 70 is arranged so that both its front and rear wheel assemblies 71F and 71R ride on the third tracks 23 as cart 70 moves from a front position at the entry end of the storage bay and a back position five pallets deep from the entry end of the storage bay.

The carts 40, 50, 60 and 70 are constructed and arranged so that the forward position of cart 50 overlies the forward position of cart 40, the forward position of carts 40 and 50, and the forward position of cart 70 overlies the forward positions of carts 40, 50, and 60. The front wheel assemblies 51F of cart 50 are spaced rearwardly of the forward end of cart 50 so that said front wheel assemblies 51F avoid contact with the front wheel assemblies 41F of cart 40 when said carts 40 and 50 are in the forward positions thereof. This ensures that the front end of cart 50 can be positioned at the front shelf in the forward position of cart 50 so that it is properly positioned to have a pallet load delivered to and removed therefrom at the entry end of the storage bay. Likewise, front wheel assemblies 71F of cart 70 are spaced rearwardly from the forward end of cart 70 so that said front wheel assemblies 71F avoid contact with the front wheel assemblies 61F of cart 60 when said carts 60 and 70 are in the forward positions thereof to thereby ensure that the front end of cart 70 can be positioned at the front shelf 11 in the forward position of cart 70. It is also noted that the rear wheel assemblies 61R of cart 60 are positioned to avoid contact with the rear wheel assemblies 51R of cart 50 when the carts 50 and 60 are in the forward positions thereof in order to ensure that the carts can be positioned at the proper forward position at the front shelf 11.

With respect to the second set of carts, cart 80 is arranged so that both its front and rear wheel assemblies 81F and 81R are positioned to ride on the tracks 24 as cart 80 moves between a forward position at the entry end of the storage bay and a back position six pallets deep from the entry end of the storage bay. Cart 90 is arranged so that its front wheel assemblies 91F ride on the fifth tracks 25 and its rear wheel assemblies 91R ride on the fourth tracks 24 as cart 90 moves from a forward position at the entry end of the storage bay and a back position seven pallets deep from the entry end of the storage bay. The carts 80 and 90 are constructed and arranged so that the forward position of cart 90 overlies the forward position of cart 80 as is apparent from a consideration of the drawings. As is shown in FIG. 4, the front wheel assemblies 91F of cart 90 are spaced rearwardly of the forward end of cart 90 so as to avoid contact with the front portion of cart 80 when carts 80 and 90 are in their forward positions. Also, the rear wheel assemblies 91R of cart 90 are spaced rearwardly of the rearward end of cart 80 so that said rear wheel assemblies 91R avoid contact with the rear wheel assemblies 81R of cart 80 when said carts 80 and 90 are in their forward positions as shown in FIG. 4. This construction insures that the front end of the cart 90 can be positioned at the front shelf 11 in the forward position of cart 90 so that it is properly positioned to have a pallet load delivered to and removed therefrom at the entry end of the storage bay.

As is described in said prior patents there are provided suitable bumper means for holding the carts 40, 50, 60, 70, 80, and 90 in their forward position at the entry end of the storage bay.

The pairs of tracks 21, 22, 23, 24, and 25 are all mounted on the shelf beams of the framework so that they extend at a slight inclination toward the entry end of the storage bay. As is described in detail in said prior patents, the inclination is achieved by the accurate locating of the position of the supporting structure for the track means and is typically about 5/16 inch for each twelve inches of length.

Carts 40, 50, 60, 70, 80 and 90 are constructed so that the pallet supporting top surface of each cart is maintained in a level (i.e., horizontal) position on the inclined track means for said carts. This type of cart construction is described in detail in said U.S. Pat. No. 4,955,489 with respect to FIGS. 18–19 thereof. Briefly, this is achieved by making the front wheel assemblies of a larger vertical extent than the rear wheel assemblies for each cart. In other words, the support means for the front wheel assemblies are constructed and arranged so that the front end of the top surface of the cart is spaced from the place of rolling contact with the track an amount greater than that of the rear end thereof so that said top supporting surface is maintained in a horizontal plane while a cart supported on the inclined tracks 21, 22, 23, 24 and 25 rides therealong. Thus, the supporting surface of the cart remains level even though the cart moves along an inclination as it moves between its forward and back positions on the inclined tracks supporting the same.

As is apparent from a consideration of the drawings, the forward position of carts 40, 50, 60, 70, 80 and 90 are located at the entry end of the storage bay, the back position of first cart 40 being two pallets deep from the entry end of the storage bay, the back position of second cart 50 being three pallets deep from the entry end of the storage bay, the back position of third cart 60 being four pallets deep from the entry end of the storage bay, the back position of fourth cart 70 being five pallets deep from the entry end of the storage bay, the back position of fifth cart 80 being six pallets deep from the entry end of the storage bay, and the back position of sixth cart 90 being seven pallets deep from the entry end of the storage bay. Thus, each row of the storage bay can store seven pallet loads A, B, C, D, E, F and G in an arrangement as best shown in FIGS. 5A, 5B. The front pallet supported load A is supported on the track means on the two I-shaped structural members forming tracks 22 and 23, the pallet load B is supported on first cart 40, the pallet load C is supported on the second cart 50, the pallet load D is supported on the third cart 60, the pallet load E is supported on the fourth cart 70, the pallet load F is supported on fifth cart 80 and the pallet load G is supported on the sixth cart 90.

The pallet loads A, B, C, D, E, F and G will be placed in the position shown in FIGS. 5A, 5B by a conventional push-back loading technique employing conventional fork trucks, which technique is well known in the art and described in detail in said prior patents. Thus, the first pallet load G to be stored will be placed on the empty sixth cart 90 which has assumed its position at the entry end of the storage bay as described above. When it is desired to store the second pallet load F in the storage bay, the fork truck approaches the storage rack at an elevation such that the fork truck and the second pallet load F gently nudge the first load G toward the rear, whereby said first load G and cart 90 supporting the same will be pushed rearwardly toward the rear of the storage rack up to the point where the fork truck can place the load F onto the empty fifth cart 80. When it is desired to store a third pallet load E, the fork truck with the said third load E approaches the storage rack and the pallet load E gently nudges the first two loads F and G toward the rear whereby the loads F and G, and the carts 80 and 90 supporting the same, are pushed back rearwardly toward the rear of the storage rack up to the point where the fork truck can place the load E on the empty fourth cart 70. When the fourth load D is to be stored, the fork truck with the pallet load D thereon gently nudges the other pallet loads E, F and G supported on carts 70, 80 and 90, respectively, toward the rear of the storage rack until the storage truck can deposit the fourth load D on the empty third cart 60. When the fifth pallet load C is to be stored, the fork truck with the pallet load C thereon gently nudges the other pallet loads D, E, F and G supported on carts 60, 70, 80 and 90, respectively, toward the rear of the storage rack until the fork truck can deposit the fifth load C on the empty second cart 50. When the sixth pallet load B is to be stored, the fork truck with the pallet load B thereon gently nudges the other pallet loads C, D, E, F and G supported on carts 50, 60, 70, 80 and 90, respectively, toward the rear of the storage rack until the fork truck can deposit the sixth load B on the empty first cart 40. When the seventh pallet load A is to be stored, the fork truck with the pallet load A thereon gently nudges the other pallet loads B, C, D, E, F and G supported on carts 40, 50, 60, 70, 80 and 90, respectively, toward the rear of the storage rack until the fork truck can deposit the seventh load A on the structural members providing tracks 22 and 23 and the front shelf beam 11 at the forward loading position at the entry end of the storage bay. In this manner the row of the storage rack is fully loaded with seven pallet loads. In order to unload the seven pallet loads, a procedure which is essentially the reverse of the above-described procedure is employed.

In FIGS. 14–20, there is shown a storage rack system in accordance with the invention for storing seven pallets deep, which system comprises a lower first cart 140, a middle first cart assembly 101 comprising a second cart 160 and a third cart 170, and a upper second cart assembly 102 comprising a fourth cart 180 and a fifth cart 190. The track means for the embodiment shown in FIGS. 14–20 comprises a C-shaped structural member forming tracks 121 and an I-shaped structural member forming tracks 122 and 123, which structural members are supported on the shelf beams 11-18 in the same manner as described above in respect to the embodiments shown in FIGS. 1–13. The embodiment of FIGS. 14–20 comprises a framework, including upright frames 10 and shelf beams 11–18, constructed and arranged essentially the same as that employed in the embodiment of FIGS. 1–13 and which provides a plurality of storage bays adapted to contain two pairs of track means for storing two rows of pallets seven deep, wherefore corresponding parts have been given the same reference numerals. The track means of the embodiment shown in FIGS. 14–20 differs from that shown in the embodiment of FIGS. 1–13 in that each of the tracks 121, 122, and 123 is located on the same level, as will be apparent from the following description.

The embodiment shown in FIGS. 14–20 is adapted for use with forklift trucks of the type known as "deep-reach" trucks, which are adapted to reach back into the storage bay to pick up and deposit a pallet load at a location either one pallet deep or two pallets deep from the entry end of the storage bay.

Briefly stated, the pairs of associated tracks 121, 122, and 123 are adapted to support the lower first cart 140, the middle first cart assembly 101 and the upper second cart assembly 102 in a manner for guiding the same for movement along the depth of the storage bay between forward and back positions. The forward positions of cart 140 and cart assemblies 101 and 102 are located at the entry end of the storage bay such that cart 160 overlies cart 140 and cart 180 overlies cart 160 at the entry end of the storage bay. The back position of cart 140 is three pallets deep from the entry end of the storage bay, the back position of cart assembly 101 is such that cart 160 is four pallets deep from the entry end of the storage bay and cart 170 is five pallets deep from the entry end of the storage bay, and the back position of cart assembly 101 is such that cart 180 is six pallets deep from the entry end of the storage bay and cart 190 is seven pallets deep from the entry end of the storage bay.

The front pallet supported load A is supported on the track means, the second pallet supported load B is supported on the track means adjacent load A, the pallet supported load C is supported on cart 140, the pallet supported load D is supported on cart 160, the pallet supported load E is supported on the cart 170, the pallet supported load F is supported on the cart 180, and the pallet supported load G is supported on the cart 190. The pallet loads A–G are placed in the position shown in FIGS. 15A and 158 by conventional push-back loading techniques utilizing the deep reach forklift trucks as is well known in the art.

Referring to the drawings, the track means comprises three pairs of associated tracks, namely, a pair of inner first tracks 121, a pair of middle second tracks 122 and a pair of outer third tracks 123. The pair of second tracks 122 and the pair of third tracks 123 are constructed to extend from the front to the back of the storage bay along the entire depth thereof, while the pair of first tracks 121 are adapted to extend only a short distance, namely, in the region of two and three pallets deep from the entry end of the storage bay. To this end, the first tracks 121 are supported on the interior shelf beams 12, 13, and 14.

The first tracks 121 are each provided by a structural member having a C-shaped cross-section, each being arranged to provide inwardly facing flanges. The second and third tracks 122,123 are each provided by a structural member having an I-shaped cross-section, said members being arranged to provide a pair of inwardly facing flanges which provide the second tracks 122 and a pair of outwardly facing flanges which provide the third tracks 123. Each structural member providing tracks 121, 122, and 123 of .the track means is supported on and secured to a plurality of the shelf beams 11, 12–17, 18 in a conventional manner as known in the art and described in detail in said prior patents.

Figure 15A:
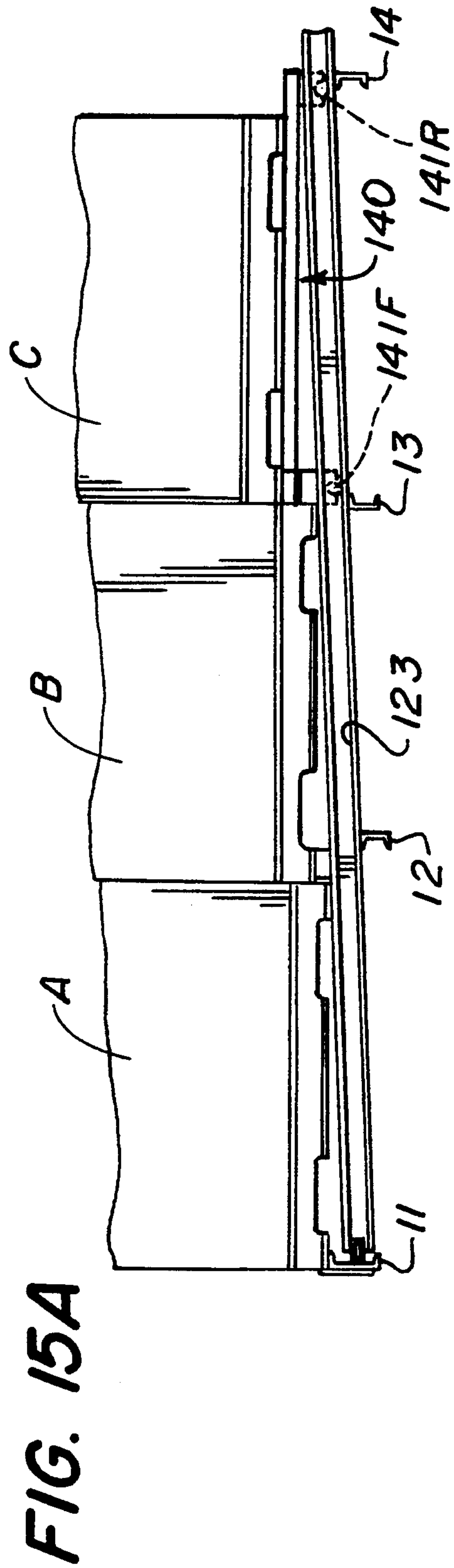
FIGS. 15A and 15B are side elevational views of the second embodiment of the invention.
Figure 16A:
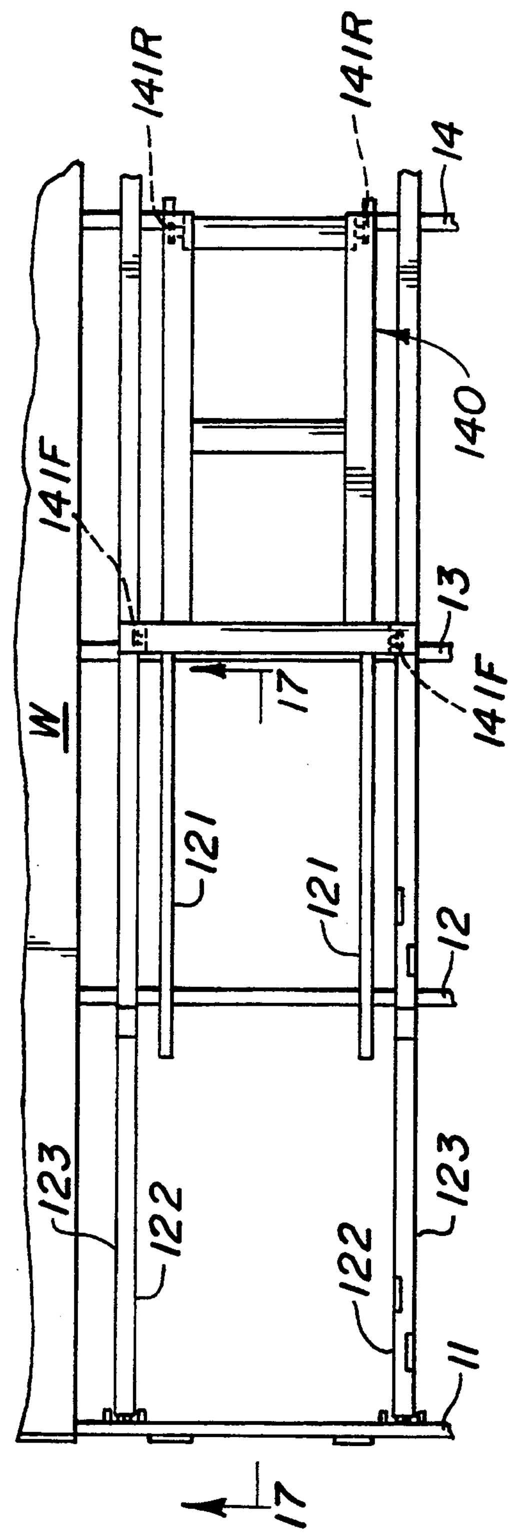
FIGS. 16A and 16B are plan views of FIGS. 15A and 15B with the pallet loads eliminated so as to illustrate the cart system in detail.
Figure 18:
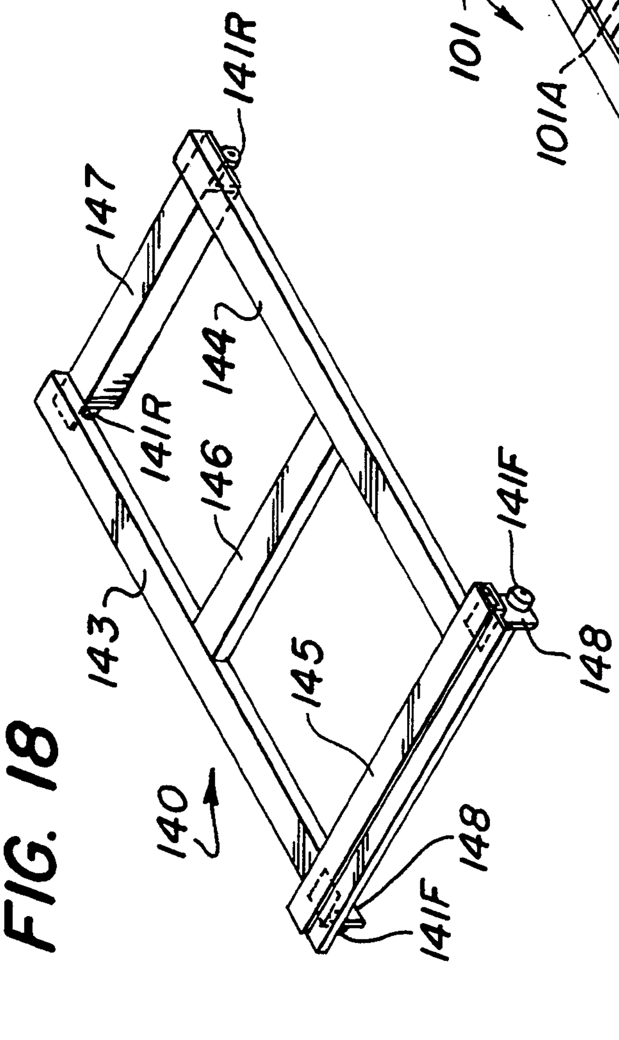

The first cart 140, which may be termed the lower cart, includes a rectangular frame formed of a plurality of structural members welded together as best shown in FIG. 18. The frame of cart 140 comprises a pair of side structural tubes 143 and 144, a front structural tube 145, a middle structural channel 146 and a rear structural angle 147. Side tubes 143 and 144 are welded at their front end to front tube 145 at locations spaced inwardly from the end portions thereof as is best shown in FIG. 18. Middle channel 146 and rear angle 147 extend between and are welded at their ends to side tubes 143 and 144. A pair of angle brackets 148 are welded to the front end of cart 140 in an arrangement shown in FIG. 18 to provide a downwardly extending leg portion for supporting the front wheel assemblies 141F of cart 140. There are provided two bearing-type wheel assemblies mounted on each side of the first cart frame at the front and rear ends thereof to provide four rolling supports for cart 140, the front wheel assembly on each side being indicated at 141F and the rear wheel assembly on each side being indicated at 141R. As best shown in FIG. 16A, the front wheel assemblies 141F ride on the inwardly facing tapered bottom flange portions of the I-shaped structural member forming second tracks 122 and the rear wheel assemblies 141R ride on the inwardly facing bottom flange portions of the C-shaped structural members forming first tracks 121. The frame for cart 140 is of a size so as to support a pallet load, as indicated by the pallet load C in the arrangement shown in FIG. 15A.

Figure 19:
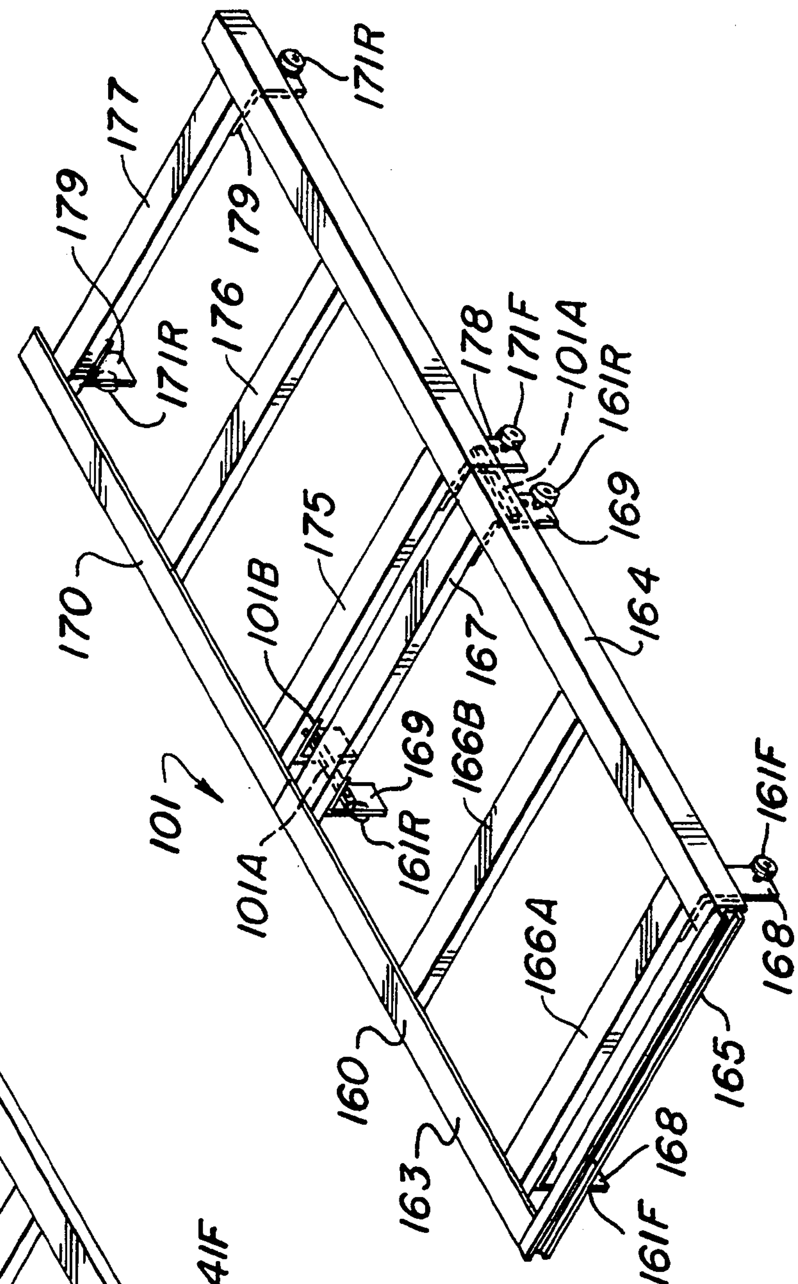
FIGS. 18, 19, and 20 are detailed perspective views illustrating the three carts employed in the second embodiment of the invention.

The middle first cart assembly 101 is shown in FIG. 19 and comprises interconnected carts 160 and 170. Cart 160, which may be termed the forward cart of the first cart assembly 101 includes a rectangular frame formed of a plurality of structural members welded together as best shown in FIG. 19. The frame of cart 160 comprises a pair of side structural angles 163 and 164, a front structural channel 165, a pair of middle structural tubes 166A,166B and a rear structural tube 167. Side angles 163 and 164 are welded at their front ends to front channel 165. Middle tubes 166A,166B and rear tube 167 extend between and are welded at their ends to side angles 163 and 164. A pair of angle brackets 168 are welded to the front end of cart 160 to provide downwardly extending leg portions for supporting outwardly facing front wheel assemblies 161F of cart 160. A pair of angle brackets 169 are welded to the rear end of cart 160 to provide downwardly extending leg portions for supporting outwardly facing rear wheel assemblies 161R of cart 160. The outwardly facing front and rear wheel assemblies 161F and 161R ride on the inwardly facing bottom flange portions of the structural member forming second tracks 122. The frame for cart 160 is of a size so as to support a pallet load, as indicated by the pallet load D in the arrangement shown in FIG. 15B.

The cart 170, which may be termed the rearward cart of the first cart assembly 101, is manufactured as an independent unit and includes a rectangular frame for providing a support for a loaded pallet, a plurality of wheel assemblies 171F and 171R on each side of the cart frame and means for supporting each of the wheel assemblies 171F, 171R to make rolling contact with second tracks 122 as cart 170 moves along the depth of the storage bay between a forward and a back position. Cart 170 includes a rectangular frame formed of six structural members welded together as best shown in FIG. 19. Cart 170 comprises a pair of side angles 173 and 174, a front tube 175, a middle channel 176 and a rear tube 177. A pair of bearing-type wheel assemblies 171F and 171R are mounted at the front and rear ends of side angles 173 and 174 so as to provide four rolling supports for cart 170. To this end, a pair of angle brackets 178 are welded to front tube 175 in an arrangement to provide a downwardly extending leg portion at each end of the tube 175 for supporting outwardly facing front wheel assemblies 171F of cart 170. Also, a pair of angle brackets 179 are welded to rear tube 177 in an arrangement to provide a downwardly extending leg portion at each end of the rear tube 177 for supporting outwardly facing rear wheel assemblies 171R. The wheel assemblies 171F and 171R are arranged to ride on the inwardly facing tapered bottom flange portion of the I-shaped structural members forming the pair of second tracks 122. The frame for cart 170 is of a size so as to be able to support a pallet load as indicated by the pallet load E in the arrangement shown in FIG. 15B.

A feature of the double cart assembly 101 is that it comprises two individual carts 160 and 170 which are connected together in a manner such that each cart 160, 170 is capable of supporting an individual pallet load independently of the other cart. This independent connection permits each cart 160 and 170 to be installed individually in the track system and interconnected while positioned in their installed condition. To this end, there is provided a pair of bars 101A, each of which extends between adjacent brackets 169 and 178 of carts 160 and 170, respectively, bars 101A being connected to brackets 169 and 178 by a suitable bolt arrangement as best shown in FIG. 19.

Figure 20:
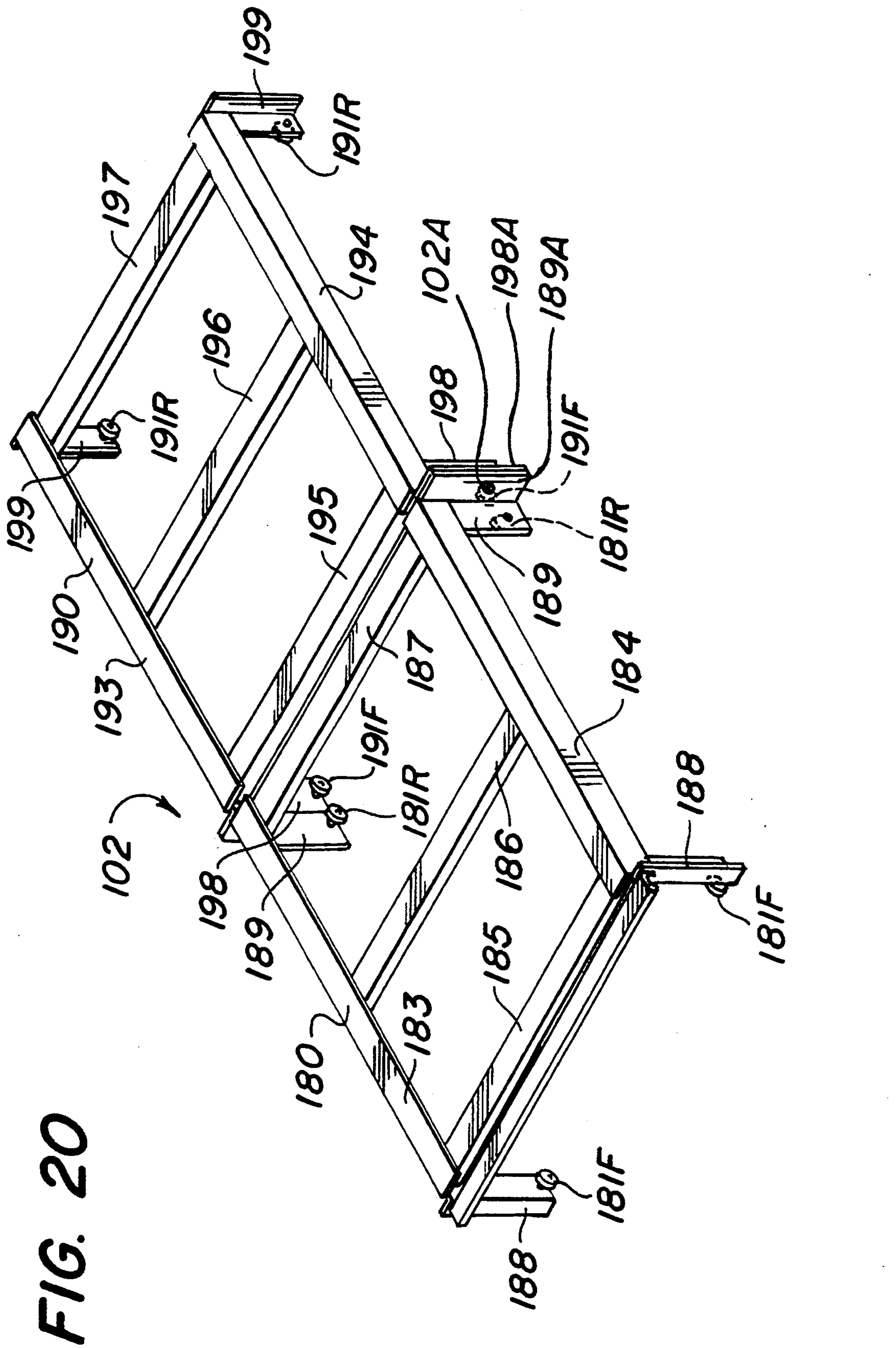

The upper second cart assembly 102 is shown in FIG. 20 and comprises interconnected carts 180 and 190. Cart 180, which may be termed the forward cart of the second cart assembly 102, includes a rectangular frame formed of a plurality of structural members welded together and best shown in FIG. 20. The frame of cart 180 comprises a pair of side structural angles 183 and 184, a front structural tube 185, a middle structural channel 186 and a rear structural tube 187. Side angles 183 and 184 are welded at their front and rear ends to front and rear tubes 185 and 187. Middle channel 186 extends between and is welded at its ends to side angles 183 and 184. A pair of angle brackets 188 are welded to the front end of cart 180 in an arrangement to provide a downwardly extending leg portion at each end for supporting the inwardly facing front wheel assemblies 181F of cart 180. Also, a pair of angle brackets 189 are welded to the rear end of cart 180 to provide downwardly extending legs for supporting inwardly facing rear wheel assemblies 181R. Thus, there are provided two bearing-type wheel assemblies mounted on each side of the cart frame at the front and rear ends thereof to provide four rolling supports for cart 180, the front wheel assembly on each side being indicated at 181F and the rear wheel assembly on each side being indicated at 181R. The front and rear wheel assemblies 181F and 181R ride on the outwardly facing tapered bottom flange portions of the I-shaped structural member forming third tracks 123. The frame for cart 180 is of a size so as to support a pallet load, as indicated by the pallet load F in the arrangement shown in FIG. 15B.

The cart 190, which may be termed the rearward cart of the second cart assembly 102, is manufactured as an independent unit and includes a rectangular frame for providing support for a loaded pallet, a plurality of wheel assemblies 191F and 191R on each side of the cart frame, and means for supporting each of the wheel assemblies 191F, 191R to make rolling contact with the third tracks 123 of the track means as cart 190 moves along the depth of the storage bay between a forward and a back position. Cart 190 includes a rectangular frame formed of five structural members welded together as best shown in FIG. 20. Cart 190 comprises a pair of side angles 193 and 194, a front tube 195, a middle channel 196 and a rear tube 197. The pairs of inwardly facing bearing-type wheel assemblies 191F and 191R are mounted on pairs of supports 198 and 199, respectively, welded to the frame at the front and rear ends of cart 190, to thereby provide four rolling supports for the cart 190. The front and rear wheel assemblies 191F and 191R ride on the outwardly facing lower flange portions of the I-shaped structural members forming the pair of third tracks 123. The frame for cart 190 is of a size so as to be able to support a pallet load as indicated by the pallet load G in the arrangement shown in FIG. 15B.

A feature of the double cart assembly 102 is that it comprises two individual carts 180 and 190 which are connected together in a manner such that each cart 180 and 190 is capable of supporting an individual pallet load independently of the other cart. This independent connection of the carts 180 and 190 permits each cart to be installed individually in the track system and interconnected while positioned in their installed condition. To this end, the brackets 189 and 198 of carts 180 and 190, respectively, are provided with vertically extending legs 189A and 198A, respectively, which are arranged in opposed relation when carts 180 and 190 are positioned in the track system. A bolt arrangement 102A is provided to interconnect said opposed leg portions 189A and 198A as best shown in FIG. 20.

The wheel assemblies for the carts 140, 160, 170, 180 and 190 are of the same general construction and are mounted on vertically extending leg portions of said carts by conventional means and in a manner as described in detail in said prior mentioned patents.

The carts 140–190 are each mounted into the tracks on which they ride by the use of cut-outs formed in the upper flanges of the structural members forming said tracks, said insulation procedure being conventional in the art and being described in detail in my prior application Ser. No. 709,664. Briefly, the cut-outs are located to correspond to the spacing of the wheel assemblies of the associated carts and actual field insertion is achieved by a procedure whereby the cart is tilted at an angle and the left side wheels are slipped into the left hand tracks and the cart is maneuvered so that the right side cart wheels can then be dropped through the track cut-outs into the installed position on the tracks.

As discussed above, cart 140 is arranged so that its front wheel assemblies 141F ride on the tracks 122 while its rear assemblies 141R ride on the tracks 121 as cart 140 moves between a forward position at the entry end of the storage bay and a back position three pallets deep from the entry end of the storage bay. Cart assembly 101, which comprises carts 160 and 170, is arranged so that all of its wheel assemblies 161F, 161R, 171F, 171R are positioned to ride on the tracks 122 as cart assembly 101 moves between a forward position at the entry end of the storage bay and a back position spanning four and five pallets deep from the entry end of the storage bay. Cart assembly 102, which comprises carts 180 and 190 is arranged so that all of its wheel assemblies 181F, 181R, 191F, 191R ride on third tracks 123 as cart assembly 102 moves from a forward position at the entry end of the storage bay and a back position spanning six and seven pallets deep from the entry end of the storage bay.

The carts 140, 160, 170, 180, and 190 are constructed and arranged so that the forward position of cart 160 overlies the forward position of cart 140 at the one pallet deep position, the forward position of cart 170 overlies the forward positions of carts 140 and 160, and the forward position of cart 190 overlies the forward position of cart 170 at the two pallet deep position.

As is described in said prior patents there are provided suitable bumper means for holding the cart 140 and cart assemblies 101 and 102 in their forward position at the entry end of the storage bay.

The pairs of tracks 121, 122, and 123 are all mounted on the shelf beams of the framework so that they extend at a slight inclination toward the entry end of the storage bay. As is described in detail in said prior patents, the inclination is achieved by the accurate locating of the position of the supporting structure for the track means and is typically about 5/16 inch for each twelve inches of length.

Carts 140, 150, 160, 170, 180 and 190 are constructed so that the pallet supporting top surface of each cart is maintained in a level (i.e., horizontal) position on the inclined track means for said carts. This type of cart construction is described in detail in said U.S. Pat. No. 4,955,489 with respect to FIGS. 18–19 thereof. Briefly, this is achieved by making the front wheel assemblies of a larger vertical extent than the rear wheel assemblies for each cart. In other words, the support means for the front wheel assemblies are constructed and arranged so that the front end of the top surface of the cart is spaced from the place of rolling contact with the track an amount greater than that of the rear end thereof so that said top supporting surface is maintained in a horizontal plane while a cart supported on the inclined tracks 121, 122, and 123 rides therealong. Thus, the supporting surface of the cart remains level even though the cart moves along an inclination as it moves between its forward and back positions on the inclined tracks supporting the same.

Figures 15B, 16B:
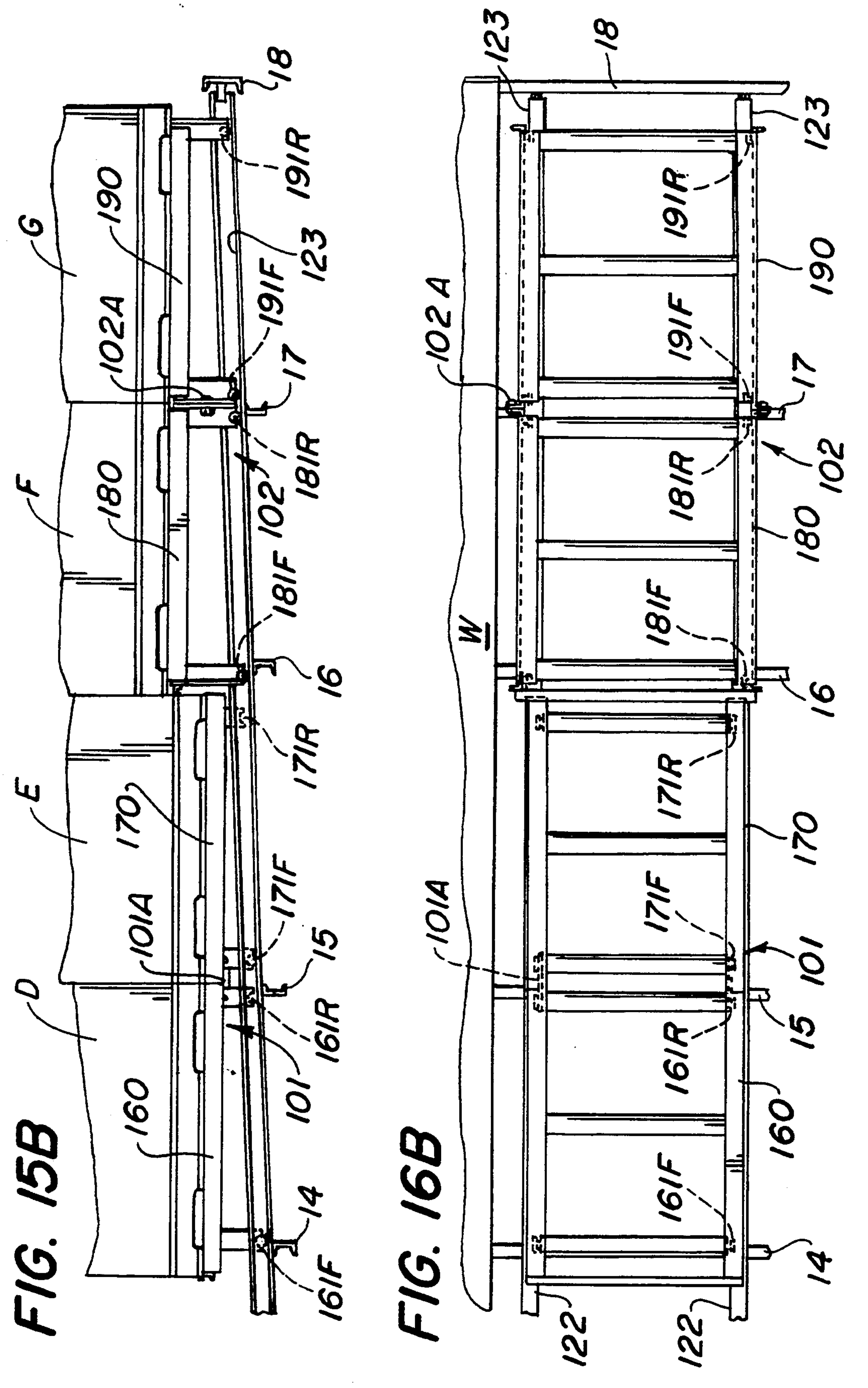
Figure 17:
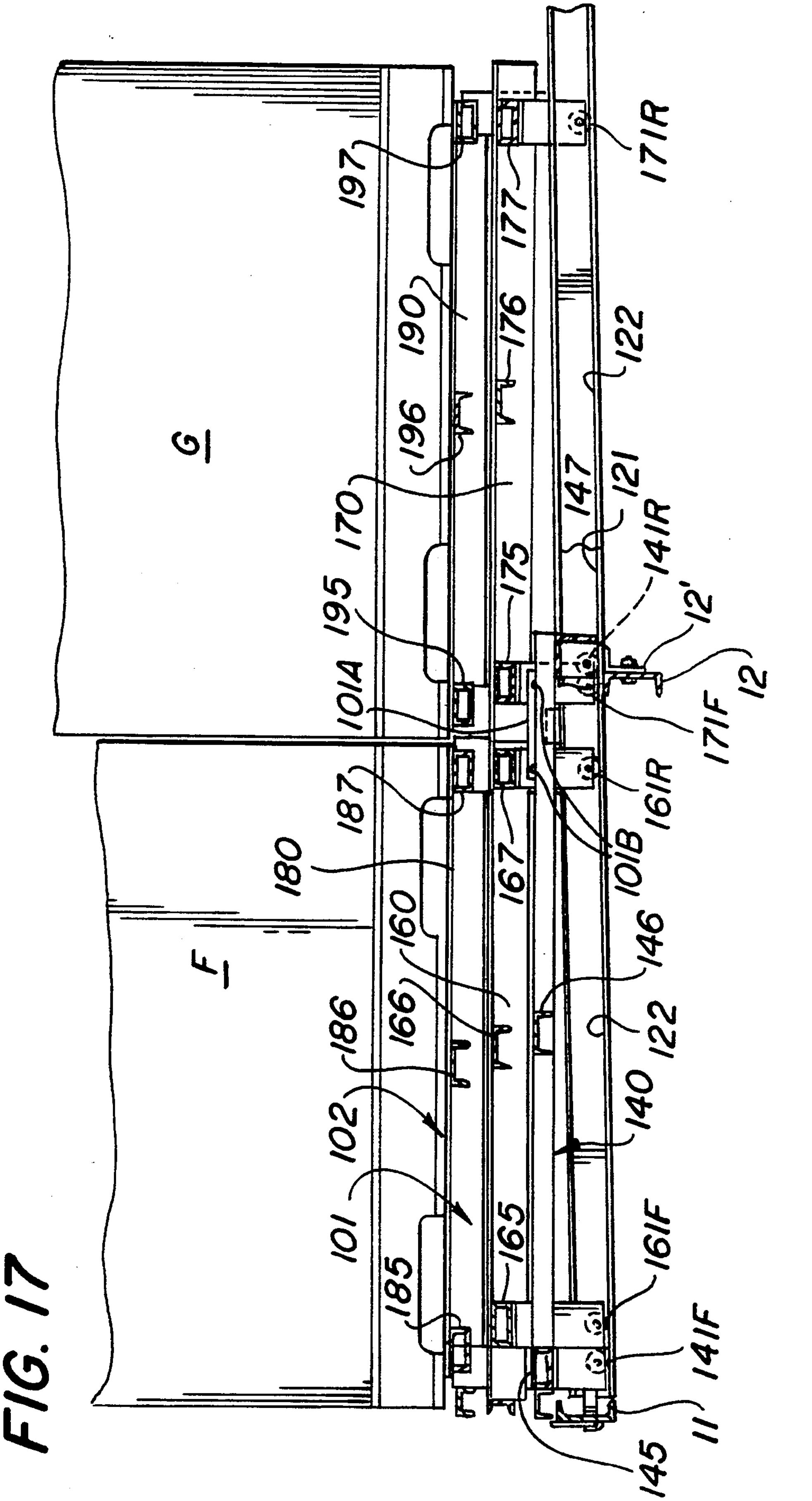
FIG. 17 is a side elevational view taken generally on line 17—17 of FIG. 16A.

As is apparent from a consideration of the drawings, the forward position of carts 140, 160, 170, 180 and 190 are located at the entry end of the storage bay, the back position of cart 140 being three pallets deep from the entry end of the storage bay, the back position of cart 160 being four pallets deep from the entry end of the storage bay, the back position of cart 170 being five pallets deep from the entry end of the storage bay, the back position of cart 180 being six pallets deep from the entry end of the storage bay, and the back position of cart 190 being seven pallets deep from the entry end of the storage bay. Thus, each row of the storage bay can store seven pallet loads A, B, C, D, E, F and G in an arrangement as best shown in FIGS. 15A, 15B. The front pallet supported load A is supported on the track means on the two I-shaped structural members forming tracks 122 and 123, the pallet load B is supported on tracks 121, 122, and 123 adjacent load A, the pallet load C is supported on the cart 140, the pallet load D is supported on the cart 160, the pallet load E is supported on the cart 170, the pallet load F is supported on cart 180 and the pallet load G is supported on the cart 190.

The pallet loads A, B, C, D, E, F and G will be placed in the position shown in FIGS. 15A, 15B by a conventional push-back loading technique employing conventional "deep-reach" forklift trucks, which technique is well known in the art. Thus, the first pallet load G to be stored will be placed on the empty rearward cart 190 of cart assembly 102 positioned two pallets deep at the entry end of the storage bay by means of a deep reach forklift truck. When it is desired to store the second pallet load F in the storage bay, the fork truck places the load F onto the empty forward cart 180 of cart assembly 102 positioned at the entry end of the storage bay. When it is desired to store a third pallet load E, the fork truck with the third load E approaches the storage rack and the pallet load E gently nudges the first two loads F and G toward the rear whereby the loads F and G, and the carts 180 and 190 of cart assembly 102 supporting the same, are pushed back rearwardly toward the rear of the storage rack up to the point where the fork truck can place the load E on the empty rearward cart 170 of cart assembly 101 two pallets deep at the entry end of the storage bay. When the fourth load D is to be stored, the fork truck with the pallet load D thereon is maneuvered to deposit the fourth load D on the empty forward cart 160 of cart assembly 101 positioned at the entry end of the storage bay. When the fifth pallet load C is to be stored, the fork truck with the pallet load C thereon gently nudges the other pallet loads D, E, F and G supported on carts 160, 170, 180 and 190, respectively, toward the rear of the storage rack until the fork truck can deposit the fifth load C on the empty cart 140. When the sixth pallet load B is to be stored, the fork truck with the pallet load B thereon gently nudges the other pallet loads C, D, E, F and G supported on carts 140, 160, 170, 180 and 190, respectively, toward the rear of the storage rack until the fork truck can deposit the sixth load B on the tracks 121, 122, and 123 at a position to pallets deep from the entry end of the storage bay. When the seventh pallet load A is to be stored, the fork truck with the pallet load A thereon is maneuvered to deposit the seventh load A on the structural members providing tracks 122 and 123 and the front shelf beam 11 at the forward loading position at the entry end of the storage bay. In this manner the row of the storage rack is full loaded with seven pallet loads. In order to unload the seven pallet loads, a procedure which is essentially the reverse on the above-described procedure is employed.

What is claimed is:

1. A storage rack for supporting pallet loads multiple pallets deep having a framework providing a plurality of storage bays, wherein at least one of said storage bays comprises:

a first set of carts, first track means extending along the depth of said storage bay for supporting said first set of carts for movement along said track means from forward positions to back positions thereof, said first set of carts including a first cart whose forward position is located at the entry end of the storage bay and whose back position is located two pallets deep from the entry end of the storage bay, a second cart whose forward position is located at the entry end of the storage bay overlying said first cart and whose back position is located three pallets deep from the entry end of the storage bay, a third cart whose forward position is located at the entry end of the storage bay overlying said second cart and whose back position is located four pallets deep from the entry end of the storage bay, and a fourth cart whose forward position is located at the entry end of the storage bay overlying said third cart and whose back position is located five pallets deep from the entry end of the storage bay, a second set of carts, and second track means extending along the depth of said storage bay for supporting said second set of carts for movement along said track means from forward positions to back positions thereof, said second set of carts including a fifth cart whose forward position is located at the entry end of the storage bay overlying said fourth cart and whose back position is located six pallets deep from the entry end of the storage bay, and a sixth cart whose forward position is located at the entry end of the storage bay overlying said fifth cart and whose back position is located seven pallets deep from the entry end of the storage bay, said second track means being located above said first track means, said first and second track means each being mounted on the storage bay framework so as to be inclined forwardly toward the entry end of said storage bay, whereby said carts are supported so that they tend to roll along said associated track means thereof toward the entry end of the storage bay.

2. A storage rack according to claim 1 wherein said first track means comprises a first pair of parallel tracks having cart supporting portions extending over a distance including only part of the depth of the storage bay and being spaced apart across the width of the storage bay, and a second pair of parallel trucks extending from the front to the back along the depth of the storage bay and being spaced apart across the width of the storage bay.

3. A storage rack according to claim 2 wherein said first track means includes a third pair of parallel tracks extending from the front to the back along the depth of the storage bay and being spaced apart across the width of the storage bay, said third pair of tracks being located outwardly of said second pair of tracks each of said carts of said first set of carts having front and rear wheel assemblies on each side thereof adapted to make rolling contact with one of said tracks of said first track means as said carts move along the depth of the storage bay between said forward and back positions thereof.

4. A storage rack according to claim 3 wherein said front wheel assemblies of said third cart are adapted to make rolling contact with said third pair of tracks of said first track means and said rear wheel assemblies of said third cart adapted to make rolling contact with said second pair of tracks of said first track means at locations rearwardly of said second cart rear wheel assemblies.

5. A storage rack according to claim 4 wherein said second and third pairs of tracks of said first track means are each formed by a structural member having an I-shaped cross-section and said first pair of tracks of said first track means are each formed by a structural member having a C-shaped cross-section.

6. A storage rack according to claim 1 wherein said second track means comprises a pair of parallel tracks extending from the front to the back along the depth of the storage bay and being spaced apart across the width of the storage bay, said pair of tracks of said second track means being formed by a structural member having a C-shaped cross-section.

7. In a storage rack for supporting pallet loads multiple pallets deep having a framework providing a plurality of storage bays each of which is defined by a plurality of vertical uprights and horizontal shelf beams, each of said storage bays comprising:

a plurality of carts, track means extending along the depth of said storage bay for supporting said carts for movement along said tracks from forward positions to back positions thereof, said track means comprising:

a first pair of parallel tracks having cart supporting portions extending over a distance including only part of the depth of the storage bay and being spaced apart across the width of the storage bay, a second pair of parallel tracks extending from front to back along the depth of said storage bay and being spaced apart across the width of the storage bay, said first pair of tracks being located inwardly for said second pair of tracks, said plurality of carts including:

a first cart including a frame providing support for a pallet load, front and rear wheel assemblies on each side of said first cart wheel assemblies to make rolling contact with one of said tracks of said track means as said first cart moves along the depth of the storage bay between a forward position and a back position, and a first cart assembly including a second cart and third cart each of which includes a frame providing support for a loaded pallet, front and rear wheel assemblies on each side of said second and third cart wheel assemblies to make rolling contact with one of said tracks of said track means as said second and third carts move along the depth of the storage bay between a forward and a back position, and means for interconnecting said second and third carts for conjoint movement along said track means, the front wheel assemblies of said first cart being constructed and arranged to make rolling contact with said second tracks and the rear wheel assemblies of said first cart being constructed and arranged to make rolling contact with said first tracks, the front and rear wheel assemblies of said second and third carts being adapted to make rolling contact with said second tracks, said track means being mounted on the storage bay framework so as to be inclined toward the entry end of said storage bay, whereby said carts are supported so that they tend to roll along said track means toward the entry end of said storage bay.

8. A storage rack according to claim 7 wherein the forward position of said first cart is located at the entry end of the storage bay, the forward position of said second cart overlying the forward position of said first cart, and the forward position of said third cart being located two pallets deep from the entry end of the storage bay, the cart supporting portions of said first tracks being located in the region of two and three pallets deep from the entry end of the storage bay.

9. A storage rack according to claim 7 for storing pallet loads of at least six pallets deep wherein said track means includes a third pair of parallel tracks extending from the front to the back along the depth of said storage bay and being spaced apart across the width of the storage bay, said third pair of tracks being located outwardly of said second pair of tracks, and a second cart assembly including a fourth cart and a fifth cart each of which includes a frame providing support for a pallet load, front and rear wheel assemblies on each side of said fourth and fifth cart frames, means for supporting each of said fourth and fifth cart wheel assemblies to make rolling contact with said third pair of tracks of said track means as said fourth and fifth carts move along the depth of the storage bay between a forward and a back position, and means for interconnecting said fourth and fifth carts for conjoint movement along said track means.

10. A storage rack according to claim 9 wherein the forward position of said fourth cart overlies the forward position of said second cart at the entry end of the storage bay, and the forward position of said fifth cart overlies the forward position of said third cart two pallets deep from entry end of the storage bay.

11. A storage rack according to claim 10 for storing pallet loads of at least seven pallets deep, wherein the cart supporting portions of said first tracks are located in the region of two and three pallets deep from the entry end of the storage bay, the back position of said first cart being located three pallets deep from the entry end of the storage bay, the back position of said first cart assembly being such that the second cart is located four pallets deep from the entry end of the storage bay and said third cart is located five pallets deep from the entry end of the storage bay, and the back position of said second cart assembly is located such that said fourth cart is located six pallets deep from the entry end of the storage bay and said fifth cart is located seven pallets deep from the entry end of the storage bay.

12. In a storage rack for supporting pallet loads at least seven pallets deep having a framework providing a plurality of storage bays, each of said storage bays comprising:

a plurality of pallet supporting cart means, track means extending along the depth of said storage bay for supporting said cart means for movement along said track means from forward positions to back positions, said track means comprising:

at least two pairs of parallel tracks having cart supporting portions extending along the depth of the storage bay and being spaced apart across the width of the storage bay, said plurality of cart means including:

a first cart means whose back position is located three pallets deep from the entry end of the storage bay, a second cart means whose back position is located four pallets deep from the entry end of the storage bay, a third cart means whose back position is located five pallets deep from the entry end of the storage bay, a fourth cart means whose back position is located six pallets deep from the entry end of the storage bay, and a fifth cart means whose back position is located seven pallets deep from the entry end of the storage bay, said tracks of said track means each being mounted on the storage bay framework so as to be inclined forwardly toward the entry end of the storage bay, whereby said cart means are supported so that they tend to move along said track means toward the entry end of the storage bay.

13. A storage rack according to claim 12 wherein at least two of said cart means have a forward position located at the entry end of the storage bay.

14. A storage rack according to claim 12 wherein the forward position of all of said cart means is located at the entry end of the storage bay.

15. A storage rack according to claim 12 wherein said second and third cart means are interconnected to form a cart assembly constructed and arranged so that said second and third cart means move together along said track means, the forward position of said second cart means being at the entry end of the storage bay and the forward position of said third cart means being two pallets deep from the entry end of the storage bay.

16. A storage rack according to claim 15 wherein said fourth and fifth cart means are interconnected to form a cart assembly constructed and arranged so that said fourth and fifth cart means move together along said track means, the forward position of said fourth cart means being located at the entry end of the storage bay and the forward position of said fifth cart being located two pallets deep from the entry end of storage bay.

17. A storage rack according to claim 16 wherein said plurality of cart means includes a sixth cart means supported for movement along said track means from a forward to a back position, said sixth cart means being located beneath said second and fourth cart means at the entry end of the storage bay in said forward position thereof and three pallets deep from the entry end to the storage bay in said back position thereof.

* * * * *